United States Patent
Pan et al.

(10) Patent No.: US 9,197,874 B1
(45) Date of Patent: Nov. 24, 2015

(54) SYSTEM AND METHOD FOR EMBEDDING STEREO IMAGERY

(71) Applicant: OmniVision Technologies, Inc., Santa Clara, CA (US)

(72) Inventors: Hui Pan, San Jose, CA (US); Jizhang Shan, Cupertino, CA (US); Xinhua Su, San Jose, CA (US); Kah-Ong Tan, Shanghai (CN); Chao Wang, Shanghai (CN)

(73) Assignee: OmniVision Technologies, Inc., Santa Clara, CA (US)

(*) Notice: Subject to any disclaimer, the term of this patent is extended or adjusted under 35 U.S.C. 154(b) by 0 days.

(21) Appl. No.: 14/334,427

(22) Filed: Jul. 17, 2014

(51) Int. Cl.
*G06K 9/00* (2006.01)
*H04N 13/00* (2006.01)

(52) U.S. Cl.
CPC ....... *H04N 13/0022* (2013.01); *H04N 13/0037* (2013.01); *H04N 2213/003* (2013.01)

(58) Field of Classification Search
USPC .......... 382/154, 282, 284, 294; 345/419, 640, 345/653, 679
See application file for complete search history.

(56) References Cited

U.S. PATENT DOCUMENTS

| | | | | |
|---|---|---|---|---|
| 6,532,022 B1* | 3/2003 | Ahmad | ............ | 345/629 |
| 7,236,622 B2* | 6/2007 | Chen et al. | ............ | 382/132 |
| 7,720,282 B2 | 5/2010 | Blake et al. | | |
| 7,991,228 B2* | 8/2011 | Blake et al. | ............ | 382/173 |
| 8,428,344 B2* | 4/2013 | Fields et al. | ............ | 382/154 |
| 8,570,372 B2* | 10/2013 | Russell | ............ | 348/136 |
| 8,619,148 B1* | 12/2013 | Watts et al. | ............ | 348/218.1 |

OTHER PUBLICATIONS

Kolmogorov, V., et al., "Probabilistic Fusion of Stereo With Color and Contrast for Bi-Layer Segmentation," IEEE Trans. PAMI, 28(9): 1480-1492, 2006.
Boykov, Y., et al., "An Experimental Comparison of Min-Cut/Max-Flow Algorithms for Energy Minimization in Vision," IEEE Trans, PAMI, 26(9):1124-1137, 2004.
Bouguet, J-Y, Camera Calibration Toolbox for Matlab., from http://www.vision.caltech.edu/bouguetj/calib_doc/index.html, 2010.
Bradski, G., "Learning Open CV:Computer Vision With the Open CV Library," Chapters 11 & 12, O'reilly 1st Edition, Sep. 2008.
Bleyer, M., et al. "Graph-Cut-Based Stereo Matching Using Image Segmentation With Symmetrical Treatment of Occlusions," Signal Processing: Image Communication 22: 127-143, 2007.

* cited by examiner

*Primary Examiner* — Yosef Kassa
(74) *Attorney, Agent, or Firm* — Lathrop & Gage LLP

(57) ABSTRACT

A method for embedding stereo imagery includes (a) transforming a foreground stereo image, extracted from a source stereo image captured by a first stereo camera, from a scale associated with the first stereo camera to a scale associated with a second stereo camera, to form a transformed foreground stereo image, and (b) embedding the transformed foreground stereo image into a target stereo image, captured by the second stereo camera, to form an embedded stereo image.

23 Claims, 11 Drawing Sheets

SYSTEM AND METHOD FOR EMBEDDING STEREO IMAGERY

BACKGROUND

Stereo movies, known as three-dimensional (3D) movies, have gained popularity in movie theaters and televisions with stereo movie display capability are now available to the consumer. Stereo movies or stereo still-images of a real scene, as opposed to a computer-generated scene, are generated using a stereo camera.

Stereo cameras generally consist of two cameras spatially offset from each other, for example such that one camera is in a left-most position and the other camera is in a right-most position as compared to the scene. Each camera captures an image of the same scene and subsequent analysis of the recorded images provides distance information in addition to standard two-dimensional images. The configuration mimics that of a pair of eyes. Humans perceive distance by comparing visual information taken in through the eyes. The distance between the eyes results in slight differences in the images formed in the two eyes. The brain processes this stereo disparity to determine the distance to various objects in the scene and provide depth perception. Similarly, two cameras placed next to each other and viewing the same scene will capture slightly different images due to the distance between the two cameras. Objects in the scene will appear in slightly different positions in the images. If the cameras are spaced apart from each other by a known distance, the three-dimensional location of objects in the scene relative to the stereo camera can be determined from the captured images by triangulation.

Stereo images or stereo video may be encoded in a two-dimensional representation. For example, using a two-dimensional display, a left-view of a scene, captured by a left-most camera, is displayed using a different polarization or color than a right-view of the same scene captured by a right-most camera. A viewer then views the two-dimensional display while wearing a set of glasses having different polarization or color transmission properties for the left and right eyes. Such glasses transmit the left-view to the left eye and the right view to the right eye, thus providing a 3D viewing experience.

SUMMARY

In an embodiment, a method for embedding stereo imagery includes (a) transforming a foreground stereo image, extracted from a source stereo image captured by a first stereo camera, from a scale associated with the first stereo camera to a scale associated with a second stereo camera, to form a transformed foreground stereo image, and (b) embedding the transformed foreground stereo image into a target stereo image, captured by the second stereo camera, to form an embedded stereo image.

In an embodiment, a system for embedding stereo imagery includes a processor and a memory, communicatively coupled with the processor, wherein the memory has instructions that, upon execution by the processor, (a) transform a foreground stereo image, extracted from a source stereo image captured by a first stereo camera, from a scale associated with the first stereo camera to a scale associated with a second stereo camera, to form a transformed stereo image, and (b) embed the transformed foreground stereo image into a target stereo image captured by the second stereo camera.

In an embodiment, a software product has instructions that are stored on non-transitory computer-readable media and, when executed by a computer, perform steps for embedding stereo imagery, wherein the instructions include (a) instructions for transforming a foreground stereo image, extracted from a source stereo image captured by a first stereo camera, from a scale associated with the first stereo camera to a scale associated with a second stereo camera, to form a transformed foreground stereo image, and (b) instructions for embedding the transformed foreground stereo image into a target stereo image captured by the second stereo camera.

DETAILED DESCRIPTION OF THE EMBODIMENTS

Figure 1:
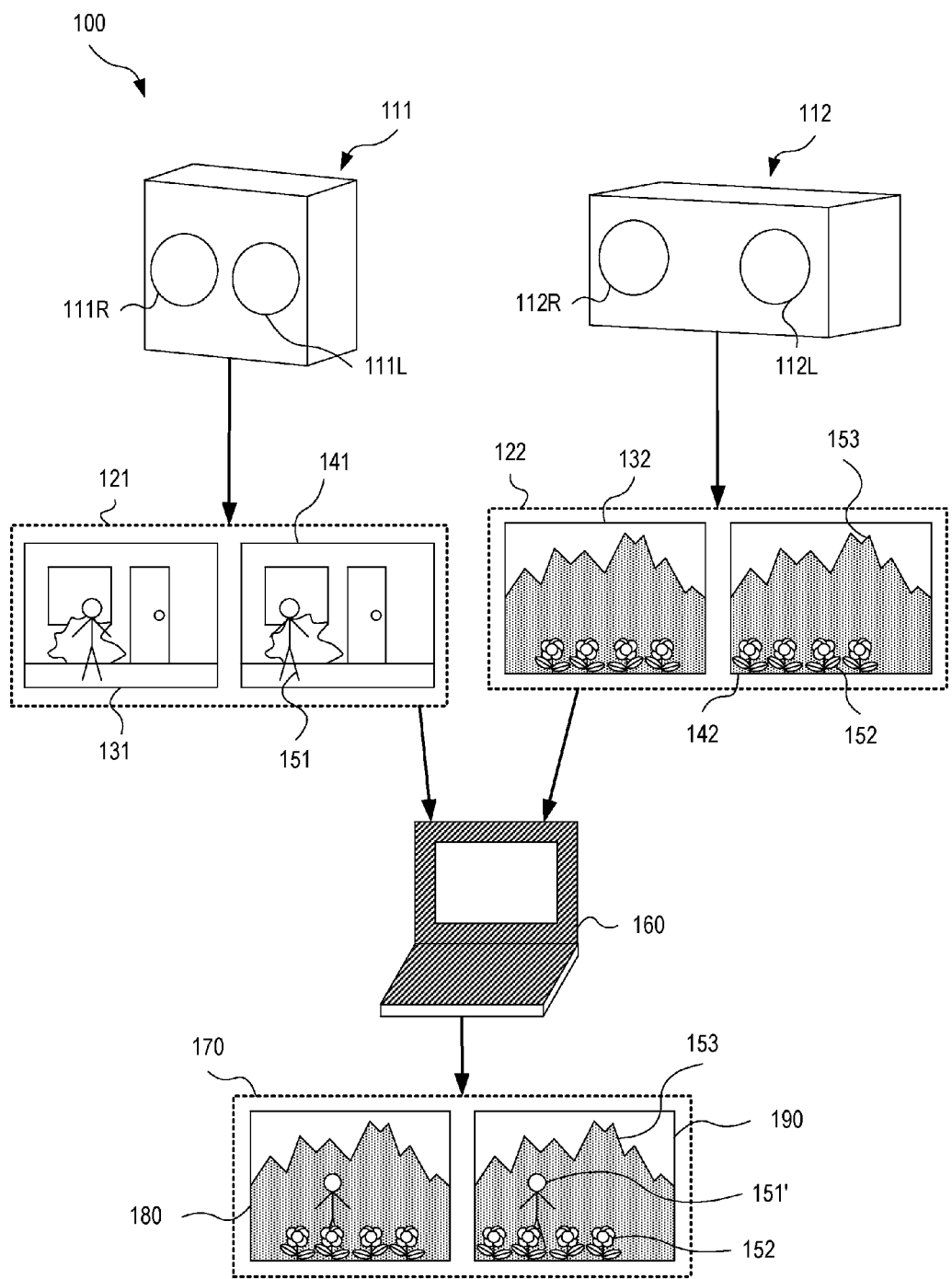
FIG. 1 illustrates one system for embedding stereo imagery, according to an embodiment.

FIG. 1 illustrates one exemplary system 100 for embedding stereo imagery. System 100 embeds a foreground stereo image, extracted from a stereo image captured by one stereo camera, into another stereo image captured by another stereo camera. Specifically, system 100 includes a first stereo camera 111, a second stereo camera 112, and a processing center 160 communicatively coupled with first stereo camera 111 and second stereo camera 112. First stereo camera includes a left camera 111L and a right camera 111R. Likewise, second stereo camera 112 includes a left camera 112L and a right camera 112R.

In an exemplary scenario, first stereo camera 111 captures a source stereo image 121 of a scene viewed by first stereo camera 111. Source stereo image 121 is represented as a two-dimensional left-view image 131 and a two-dimensional right-view image 141 captured by left camera 111L and right camera 111R, respectively. Second stereo camera 112 captures a target stereo image 122 of a scene viewed by second stereo camera 112. Target stereo image 122 is represented as a left-view image 132 and a two-dimensional right-view image 142 captured by left camera 112L and right camera 112R, respectively. Although FIG. 1 illustrates source stereo image 121 and target stereo image 122 as each being represented by corresponding left- and right-view images, first and second stereo cameras 111 and 112 may output source stereo image 121 and target stereo image 122, respectively, in any representation known in the art, such as color anaglyph or tabular form, without departing from the scope hereof. Such representations may include information equivalent to the information provided by left-view and right-view images.

First stereo camera 111 and second stereo camera 112 communicate source and target stereo images 121 and 122, respectively, to processing center 160. Processing center 160 processes source and target stereo images 121 and 122 to embed a foreground 151 of source stereo image 121 into target stereo image 122, resulting in an embedded stereo image 170 having left-view and right-view images 180 and 190, respectively. For clarity of illustration, foreground stereo image 151 is labeled only in right-view image 141. As above, embedded stereo image 170 may be represented using other representations known in the art, without departing from the scope hereof, such as tabular form.

Processing center 160 embeds foreground 151 into target stereo image 122 at the proper depth, thus providing a natural-looking image of the combined scene. In the exemplary scenario illustrated in FIG. 1, target stereo image 122 includes a very-near foreground stereo image 152, which is closer to second stereo camera 112 than foreground 151 is to first stereo camera 111, and a background 153 further away from second stereo camera 112 than foreground 151 is from first stereo camera 111. For clarity of illustration, very-near foreground 152 and background 153 are labeled only in right-view image 142. Embedded stereo image 170 shows foreground 151, or a transformed foreground 151' as will be discussed below, at the proper depth location between very-near foreground 152 and background 153. Additionally, embedded stereo image 170 shows foreground 151 (or transformed foreground 151'), very-near foreground 152, and background 153 with the proper occlusion relationships.

In an embodiment, first stereo camera 111 has properties different from second stereo camera 112 such that source stereo image 121 has scale different from target stereo image 122. Herein, scale refers to the (a) two-dimensional scale of left-view and right-view images and (b) depth scale of the stereo image. The two-dimensional scale of left-view and right-view images is, for example, defined as two-dimensional distance, substantially orthogonal to the optical axis of the stereo camera in a scene per image pixel. Herein, the optical axis of a stereo camera refers to the average of the left camera optical axis and the right camera optical axis. The depth scale is, for example, defined as depth distance, substantially parallel to the optical axis of the stereo camera, in a scene as a function of stereo disparity between left-view and right-view images. Stereo disparity is the difference between the position of a feature in the left-view image of a stereo image and the position of the same feature in the right-view image of the same stereo image. Source stereo image 121 and target stereo image 122 may differ in one of both of two-dimensional scale and depth scale.

In one example, first and second stereo cameras 111 and 112 have different field of view size, which leads to a difference in the two-dimensional scale of source stereo image 121 and target stereo image 122. In another example, first and second stereo cameras 111 and 112 have different stereo baselines. The stereo baseline of a stereo camera is the distance from the left camera to the right camera (e.g., left camera 111L and right camera 111R) along a direction orthogonal to the optical axis of the stereo camera; the optical axis of the stereo camera being the average of the optical axes of the left and right cameras. In this example, the depth scale of source stereo image 121 is different from the depth scale of target stereo image 122. In yet another example, first and second stereo cameras 111 and 112 differ in both field of view size and stereo baseline such that source and target stereo images 121 and 122 differ in both two-dimensional scale and depth scale.

In embodiments of system 100, wherein source stereo image 121 and target stereo image 122 have different scale, processing center 160 transforms foreground stereo image 151 from the scale of source stereo image 121 to the scale of target stereo image 122. The outcome of this transformation is a transformed foreground 151' represented with depth and two-dimensional scale properties associated with target stereo image 122. Consequently, embedded stereo image 170 shows transformed foreground 151' as if captured by second stereo camera 112.

Accordingly, embedded stereo image 170 generated by system 100 and the methods implemented therein provides a natural-looking stereo image of the combined scene. Foreground 151 of source stereo image 121 is embedded into target stereo image 122 with proper two-dimensional scale, proper depth, and proper occlusion relationships with respect to objects of target stereo image 122.

Figure 2:
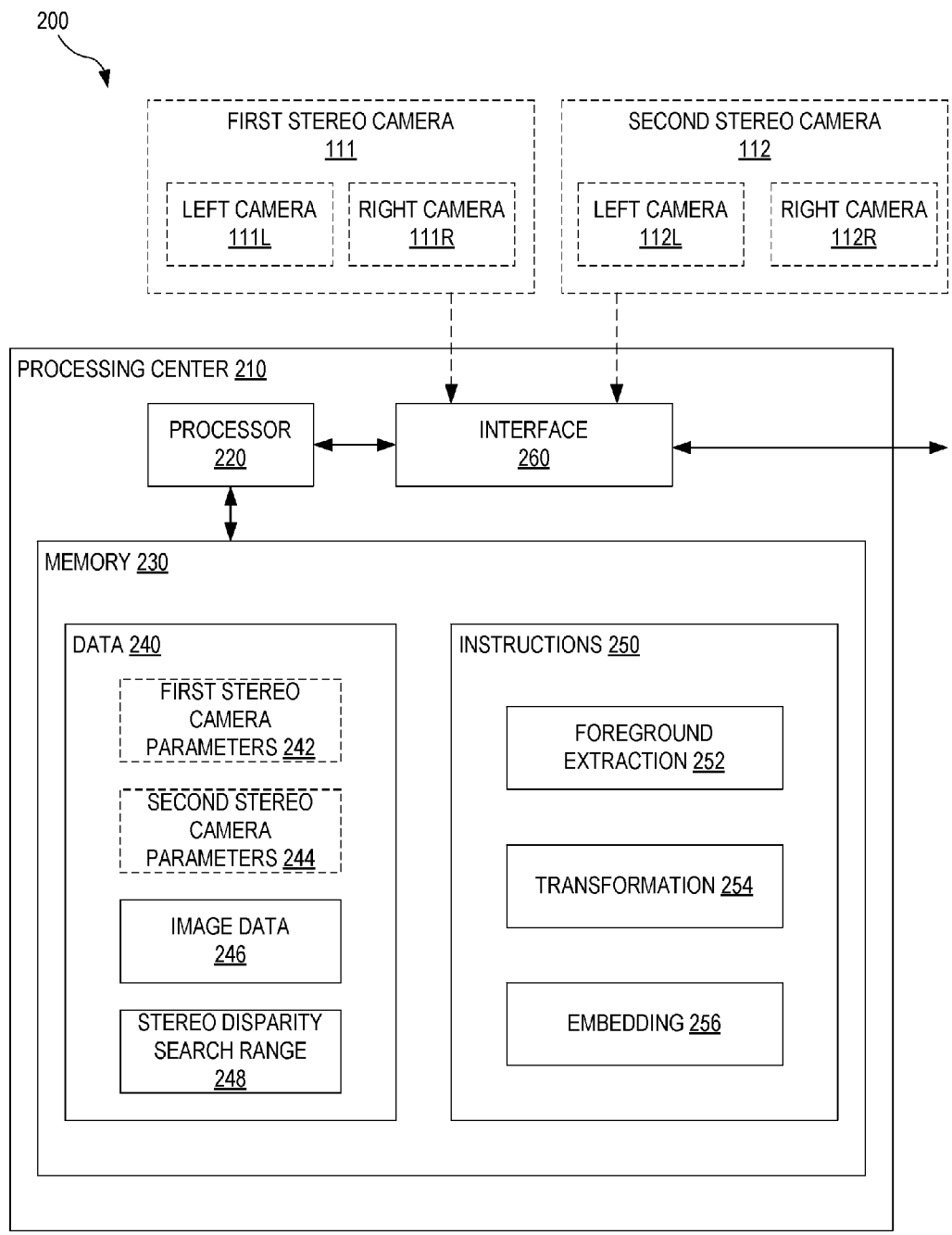
FIG. 2 illustrates another system for embedding stereo imagery, according to an embodiment.

FIG. 2 illustrates one exemplary system 200 for embedding stereo imagery. System 200 embeds a foreground stereo image, captured by one stereo camera, into another stereo image captured by another stereo camera. System 200 includes a processing center 210 that processes a source stereo image and a target stereo image to extract, from the source stereo image, a foreground stereo image and embed the foreground stereo image into the target stereo image with proper depth, two-dimensional size, and occlusion relationships. Processing center 210 is an embodiment of processing center 160, FIG. 1.

In an embodiment, system 200 includes first stereo camera 111 and second stereo camera 112, both of FIG. 1, communicatively coupled with an interface 260 of processing center 210. First stereo camera 111 captures the source stereo image and communicates the source stereo image to interface 260. Second stereo camera 112 captures the target stereo image and communicates the target stereo image to interface 260. System 200 is for example an embodiment of system 100, FIG. 1. In certain embodiments, first stereo camera 111 and second stereo camera 112 are both rectified to frontal parallel setting. Hence, left camera 111L and right camera 111R have parallel, mutually offset optical axes and are offset from each other only in a direction orthogonal to their parallel, mutually offset optical axes. Likewise, left camera 112L and right camera 112R have parallel, mutually offset optical axes and are offset from each other only in a direction orthogonal to their parallel, mutually offset optical axes.

In addition to interface 260, processing center 210 includes a processor 220 and a memory 230. Memory 230 includes a data storage 240 and machine-readable instructions 250. Machine-readable instructions 250 may be encoded in a non-volatile and/or non-transient portion of memory 230. Optionally, data storage 240 includes first stereo camera parameters 242 and second stereo camera parameters 244. First and second stereo camera parameters 242 and 244, respectively, include parameters used to define scale properties of the source stereo image and the target stereo image, respectively. Data storage 240 further includes an image data storage 246 and a stereo disparity search range 248. Instructions 250 includes foreground extraction instructions 252, transformation instructions 254, and embedding instructions 256.

Processor 220 communicatively couples with interface 260 and memory 230. Processor 220 receives the source and target stereo images from interface 260. Processor 220 executes foreground extraction instructions 252 on the source stereo image to extract a foreground stereo image therefrom. Optionally, processor 220 also executes foreground extraction instructions 252 on the target stereo image to extract therefrom a very-near foreground as discussed in connection with FIG. 1. Processor 220 executes transformation instructions 254 on the foreground stereo image to transform the foreground stereo image from scale associated with first stereo camera 111 to scale associated with second stereo camera 112. Processor 220 executes embedding instructions 256 on the transformed foreground stereo image and the target stereo image, or very-near foreground and background stereo images extracted therefrom, to embed the foreground stereo image into the target stereo image, thus forming an embedded stereo image. Additionally, processor 220 communicates the embedded stereo image to a user or an external system, such as a display, via interface 260. Processor 220 may store one or more of the source stereo image, the target stereo image, the foreground stereo image, the very-near foreground stereo image, and the embedded stereo image to image data storage 246, as well as retrieve one or more of such images from image data storage 246.

Figure 3:
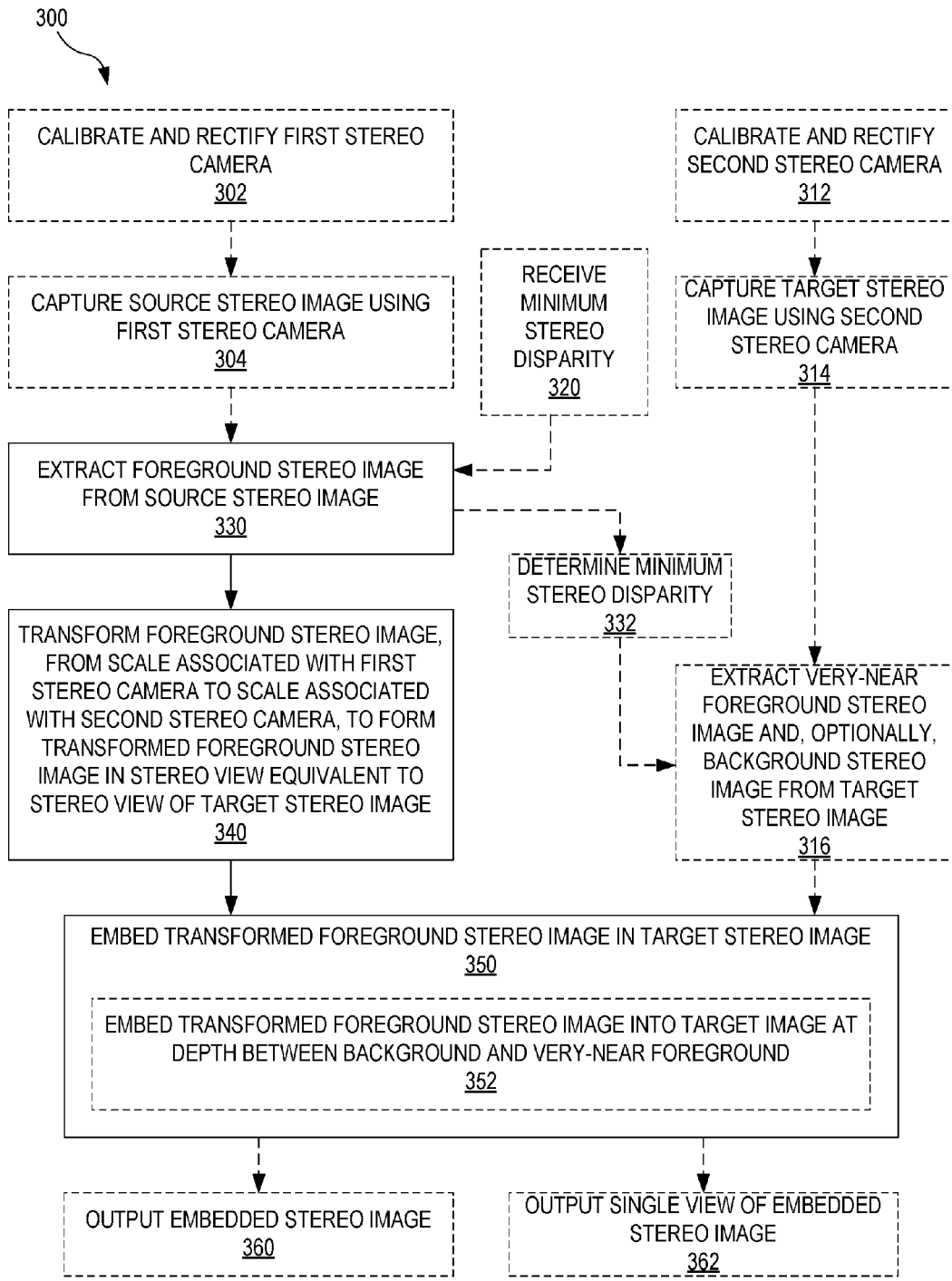
FIG. 3 illustrates one method for embedding stereo imagery, according to an embodiment.
Figure 4:
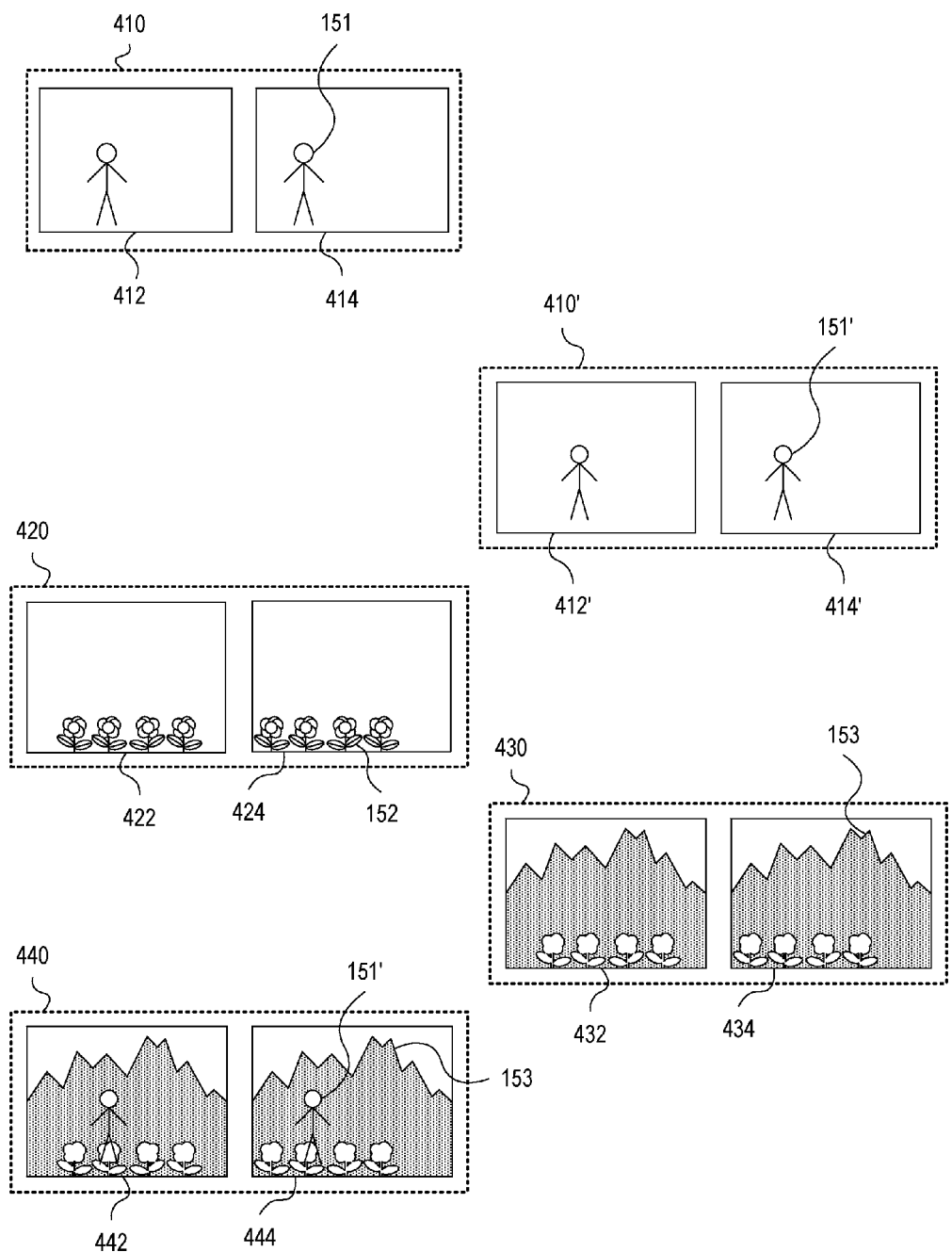
FIG. 4 shows exemplary stereo images associated with the method of FIG. 3.

FIG. 3 is a flowchart illustrating one exemplary method 300 for embedding stereo imagery. Method 300 embeds a foreground stereo image, of a source stereo image generated by a first stereo camera, into a target stereo image generated by a second stereo camera. Processing center 160 of FIG. 1 or processing center 210 of FIG. 2 may utilize method 300 to embed foreground stereo image 151 (FIG. 1) into target stereo image 122 (FIG. 1) to produce embedded stereo image 170 (FIG. 1). Certain steps of method 300 are illustrated by stereo images of FIG. 1. FIG. 4 illustrates related steps of method 300 for the same example. FIG. 2 is best view together with FIGS. 3 and 4.

In a step 330, a foreground stereo image is extracted from a source stereo image captured by a first stereo camera. Step 330 may utilize stereo image segmentation methods known in the art. In an example of step 330, processor 220 (FIG. 2) retrieves source stereo image 121 (FIG. 1) from image data storage 246 (FIG. 2) or receives source stereo image 121 from interface 260 (FIG. 2). Processor 220 then executes foreground extraction instructions 252 on source stereo image 121 to extract foreground 151 (FIG. 1) from source stereo image 121 (FIG. 1) captured by first stereo camera 111. This results in the formation of a foreground stereo image 410 (FIG. 4). Foreground stereo image 410 is represented by a left-view image 412 and a right-view image 414, and includes foreground 151. For clarity of illustration, foreground 151 is labeled only in right-view image 414. Processor 220 stores foreground stereo image 410 to image data storage 246.

In a step 340, the foreground stereo image generated in step 330 is transformed from the scale associated with the first stereo camera to the scale associated with the second stereo camera. This transformation produces a transformed foreground stereo image in a stereo view equivalent to the stereo view of target stereo image. In an example of step 340, processor 220 retrieves foreground stereo image 410 from image data storage 246 and executes transformation instructions 254 on foreground stereo image 410 to form a transformed foreground stereo image 410' shown in FIG. 4. Transformed foreground stereo image 410' is represented by a left-view image 412' and a right-view image 414', and includes a transformed foreground 151'. Transformed foreground 151' is foreground 151 depicted in the scale of second stereo camera 112. For clarity of illustration, transformed foreground 151' is labeled only in right-view image 414'. Processor 220 stores transformed foreground stereo image 410' to image data storage 246.

In a step 350, the transformed foreground stereo image generated in step 340 is embedded in the target stereo image at the proper depth and size, and with the proper occlusion relationships, corresponding to the source and target stereo images originating from the same stereo camera. In an example of step 350, processor 220 retrieves transformed foreground stereo image 410' from image data storage 246, and retrieves target stereo image 122 (FIG. 1) from image data storage 246 (or alternatively receives target stereo image 122 (FIG. 1) from interface 260). Processor 220 then executes embedding instructions 256 on transformed foreground stereo image 410' and target stereo image 122 to embed transformed foreground 151' in target stereo image 122 (FIG. 1) to form embedded stereo image 170 (FIG. 1).

In an embodiment, method 300 includes a step 316 and step 350 includes a step 352. In step 316 a very-near foreground stereo image and, optionally, a background stereo image is extracted from the target stereo image. The very-near foreground stereo image shows objects of the target stereo image that are closer to the second stereo camera than the foreground of the source stereo image is to the first stereo camera. The background stereo image shows the remaining portion of the target stereo image. Step 316 may utilize the same method as utilized in step 340, however applied to the source stereo image. In an example of step 316, processor 220 retrieves target stereo image 122 from image data storage 246 or receives target stereo image from interface 260. Next, processor 220 executes foreground extraction instructions 252 on target stereo image 122 to extract therefrom a very-near foreground stereo image 420 shown in FIG. 4. Very-near foreground stereo image 420 is represented by a left-view image 422 and a right-view image 424, and includes very-near foreground 152 (FIG. 1). Optionally, processor 220 executes foreground extraction instructions 252 on target stereo image 122, using information gathered from very-near foreground stereo image 424, to generate a background stereo image 430 shown in FIG. 4. Background stereo image 430 is represented by a left-view image 432 and a right-view image 434, and includes background 153 (FIG. 1). Processor 220 then stores very-near foreground stereo image 420, and optionally background stereo image 430, to image data storage 246.

Although illustrated in FIG. 4 as being represented by left-view and right-view images, foreground stereo image 410, transformed foreground stereo image 410', very-near foreground stereo image 420, and background stereo image 430 may be represented differently (e.g., by color anaglyph, tabular data, or other representations known in the art), without departing from the scope hereof.

In step 352, the transformed foreground stereo image is embedded in the target stereo image at a depth between the background and very-near foreground of the target stereo image. In an example of step 352, processor 220 retrieves (a) transformed foreground stereo image 410', (b) very-near foreground stereo image 420, and (c) background stereo image 430 or target stereo image 122 from image data storage 246. Processor 220 then executes embedding instructions 256 on (a) transformed foreground stereo image 410', (b) very-near foreground stereo image 420, and (c) background stereo image 430 or target stereo image 122 to produce embedded stereo image 170 with transformed foreground 151' layered between background 153 and very-near foreground 152. Processor 220 may store embedded stereo image 170 to image data storage 246.

In an optional step 360, the embedded stereo image generated in step 350 is outputted. In an example of step 360, processor 220 outputs embedded stereo image 170 to a user or an external system, such as a display, via interface 260. Processor 220 may output embedded stereo image 170 immediately upon generation thereof, or retrieve embedded stereo image 170 from image data storage 246.

In an embodiment, method 300 includes a step 362 wherein a single view (i.e., the left view or the right view) of the embedded stereo image is outputted. This view does not provide a stereo image. However, through the stereo image processing performed in steps 330, 340, and 350, a two-dimensional image is produced in which the foreground of the source stereo image is shown in the scene of the target stereo image with the proper occlusion relationships and proper size. In an example of step 362, processor 220 outputs left-view image 180 (FIG. 1), in which transformed foreground 151' appears in front of background 153 and behind very-near foreground 152.

The foreground extraction of step 340 requires information about depth of foreground to identify which objects of the source stereo image are foreground objects and which objects of the target stereo image belong to the very-near foreground. In an embodiment, method 300 includes a step 320 in which a minimum stereo disparity is received for use in subsequent step 340. This minimum stereo disparity defines a maximum distance between the first stereo camera and an object in the scene for which the object would be classified as a foreground object. Alternatively, step 320 may provide the maximum distance, while the associated minimum stereo disparity is deduced therefrom in step 330. In an example of step 320, processor 220 receives a minimum stereo disparity from a user through interface 260 and stores this minimum stereo disparity to stereo disparity search range 248. In subsequent step 340, processor 220 may then retrieve the minimum stereo disparity from stereo disparity search range 248 during execution of foreground extraction instructions 252.

Similarly, the very-near foreground extraction of optional step 316 needs depth information to determine which objects in the target stereo image belong to the very-near foreground. In an embodiment, method 300 includes a step 332, in which the minimum stereo disparity associated with the very-near foreground of the target stereo image is deduced from foreground information gathered in step 330. Since the very-near foreground of the target stereo image is composed of objects that are closer to the second stereo camera than foreground objects of the source stereo image are to the first stereo camera, step 332 derives the minimum stereo disparity associated with the very-near foreground of the target stereo image from the maximum stereo disparity of the foreground of the source stereo image. For example, during step 330, processor 220 stores the maximum stereo disparity of foreground stereo image 410 to stereo disparity search range 248. In step 332, processor 220 retrieves the maximum stereo disparity of foreground stereo image 410 from stereo disparity search range 248 and executes transformation instructions 254 to transform the maximum stereo disparity of foreground stereo image 410 to the depth scale of second stereo camera 112. This provides determination of the minimum stereo disparity of objects in target stereo image 122 belonging to very-near foreground 152. Processor 220 then stores this minimum stereo disparity to stereo disparity search range 248 for retrieval therefrom in step 316.

In certain embodiments, method 300 relies on the source and target stereo images being captured by stereo cameras rectified to frontal parallel setting. Such embodiments of method 300 may include steps 302, 304, 312, and 314. In step 302, the first stereo camera is calibrated and rectified to frontal parallel setting. The calibration includes determining intrinsic parameters, extrinsic parameter, and distortion of the first stereo camera. The intrinsic parameters characterize properties of individual cameras within the first stereo camera, such as left camera 111L of first stereo camera 111. The intrinsic properties are, for example, focal length and principal point location. The extrinsic parameter characterizes the positional relationship between the two individual cameras of the first stereo camera, such as the positional relationship between left camera 111L and right camera 111R of first stereo camera 111. The extrinsic parameter is, for example, the stereo baseline. Rectification of the first stereo camera utilizes calibrated values of intrinsic parameters, extrinsic parameter, and lens distortion to modify raw images captured by the first stereo camera to produce stereo images that appear to have been captured by a stereo camera, in which (a) the two individual cameras have identical intrinsic parameters, (b) the two individual cameras are free of lens distortion, and (c) epipolar lines are horizontal, i.e., parallel to the stereo baseline, and parallel such that a feature viewed by both cameras is located on the same vertical position in the image. Calibrated and rectified values of the focal length, principal point location, and stereo baseline of first stereo camera 111 may be stored to first stereo camera parameters 242 (FIG. 2) for use by processor 220 in step 340 and, optionally, step 316. Step 302 may use methods known in the art to calibrate and rectify the first stereo camera, such as Bouguet's algorithm (J.-Y. Bouguet, Camera calibration toolbox for Matlab, 2010, http://www.vision.caltech.edu/boueuetj/calib_doc/index.html).

In a step 304, the rectified first stereo camera captures the source stereo image. In an example of step 304, first stereo camera 111 captures source stereo image 121 and communicates stereo image 121 to interface 260.

Steps 312 and 314 may be identical to steps 302 and 304, respectively, except for being applied to the second stereo camera and the target stereo image. Calibrated and rectified values of the focal length, principal point location, and stereo baseline of second stereo camera 112 are for example stored to second stereo camera parameters 244 (FIG. 2) for use by processor 220 in step 340 and, optionally, step 316. But the first stereo camera may have properties different from rectified second stereo camera. The transformation of step 340, and optionally the transformation of optional step 332, ensures that the foreground of the source stereo image is embedded into the target stereo image with proper depth and two-dimensional size to produce a natural-looking embedded stereo image.

Without departing from the scope hereof, method 300 may be performed on a single pair of source and target stereo images, as discussed above, or be performed repeatedly to processes video streams, generated by the first and second stereo cameras, to produce an embedded stereo video stream.

Figure 5:
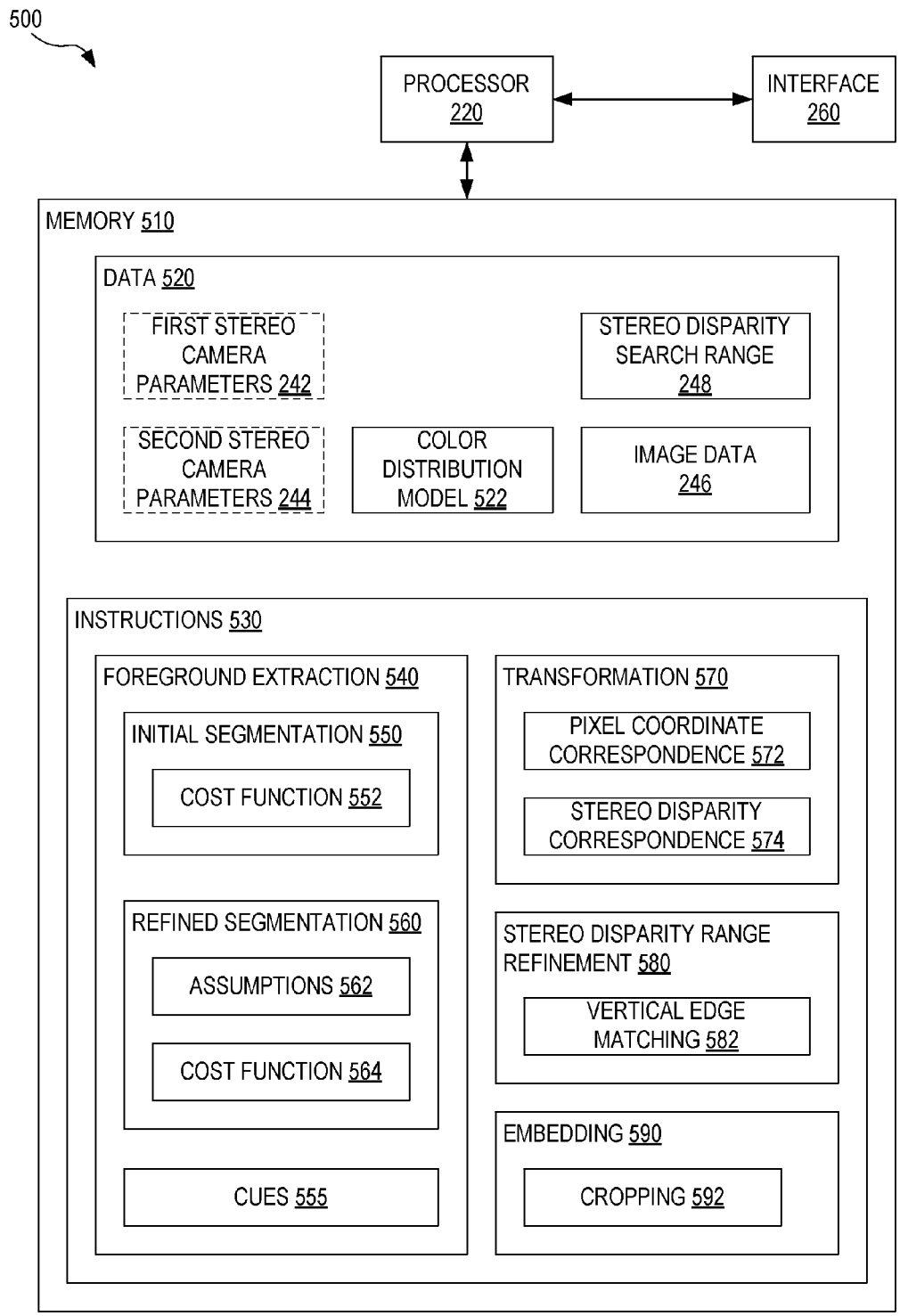
FIG. 5 illustrates yet another system for embedding stereo imagery, according to an embodiment.

FIG. 5 illustrates one exemplary processing center 500 for embedding stereo imagery. System 500 processes a source stereo image and a target stereo image captured by a first and second stereo camera, respectively, to embed a foreground of the source stereo image into the target stereo image. Processing center 500 may be implemented into system 200 as an embodiment of processing center 210 (FIG. 2). Processing center 500 includes processor 220 (FIG. 2), interface 260 (FIG. 2), and a memory 510. Processor 220 is communicatively coupled with interface 260 and memory 510. Memory 510 is an embodiment of memory 230 (FIG. 2). Memory 510 includes data storage 520 and machine-readable instructions 530. Instructions 530 are encoded in a non-volatile/non-transitory portion of memory 510. Data storage 520 and instructions 530 are embodiments of data storage 240 (FIG. 2) and instructions 250 (FIG. 2), respectively.

Data storage 520 includes image data storage 246 (FIG. 2), stereo disparity search range 248 (FIG. 2), and color distribution module 522. Optionally, data storage 520 further includes first stereo camera parameters 242 (FIG. 2) and second stereo camera parameters 244 (FIG. 2).

Instructions 530 include foreground extraction instructions 540, transformation instructions 570, stereo disparity range refinement instructions 580, and embedding instructions 590. Foreground extraction instructions 540, transformation instructions 570, and embedding instructions 590 are embodiments of foreground extraction instructions 252 (FIG. 2), transformation instructions 254 (FIG. 2), and embedding instructions 256 (FIG. 2), respectively. Foreground extraction instructions 540 include (a) initial segmentation instructions 550 having a cost function 552, (b) refined segmentation instructions 560 having assumptions 562 and a cost function 564, and (c) cues 555. Transformation instructions 570 include pixel coordinate correspondence 572 and stereo disparity correspondence 574. Stereo disparity range refinement instructions 580 include vertical edge matching instructions 582. Embedding instructions 590 include cropping instructions 592.

Figure 6:
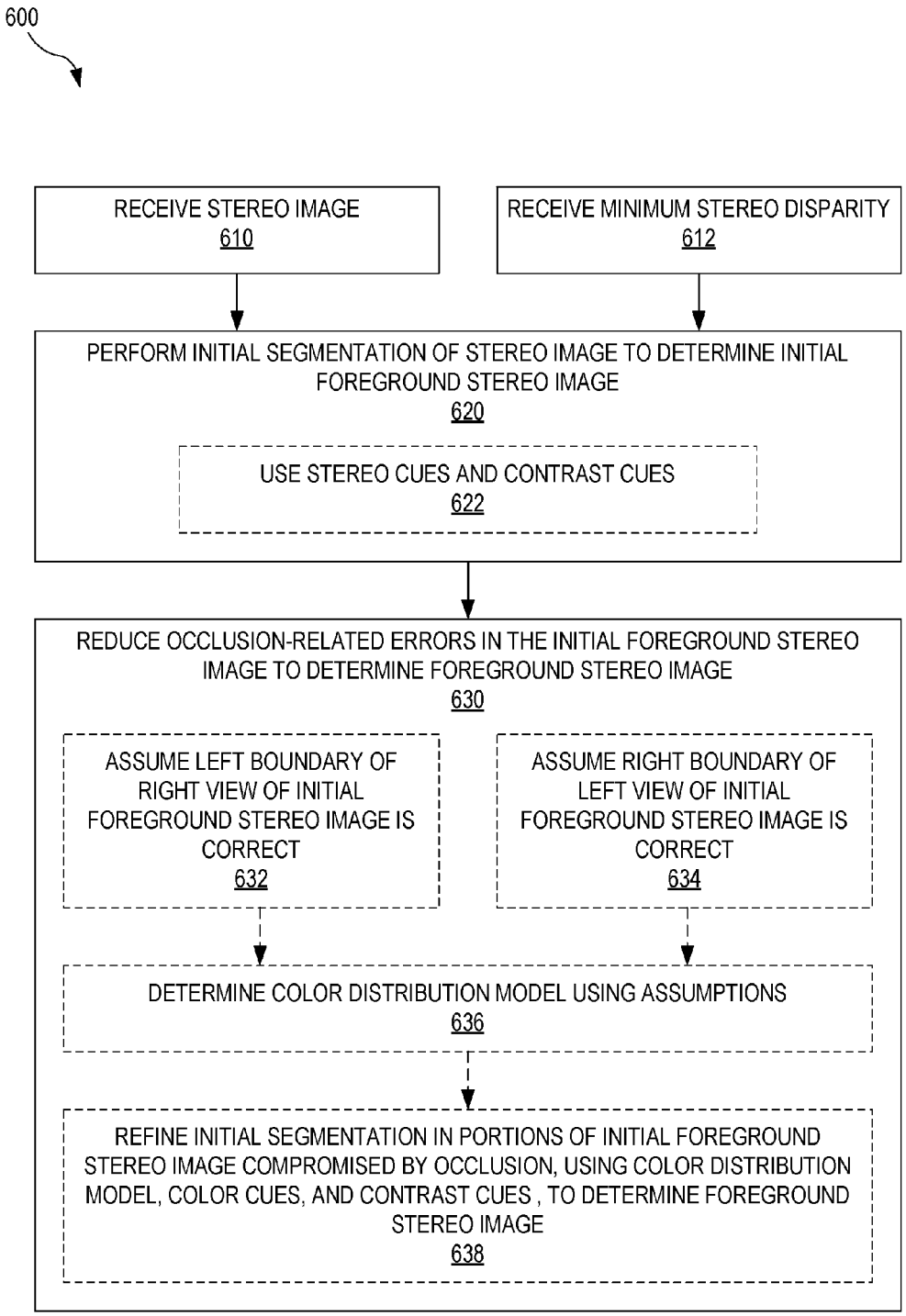
FIG. 6 illustrates one method for extracting a foreground stereo image from a stereo image, according to an embodiment.

FIG. 6 illustrates one exemplary method 600 for extracting a foreground stereo image from a stereo image. Method 600 may be implemented in method 300 (FIG. 3) as an embodiment of step 330 (FIG. 3) and/or as an embodiment of step 316 (FIG. 3). Furthermore, processing center 500 (FIG. 5) may implement method 600 as foreground extraction instructions 530.

In a step 610, a source stereo image is received, for example from step 304 of method 300 (FIG. 3). In a step 612, a minimum stereo disparity $N_0$ is received, for example from step 320 of method 300 (FIG. 3). The minimum stereo disparity $N_0$ defines the maximum distance from the stereo camera, used to capture the stereo image received in step 610, to objects that would be considered belonging to the foreground of the stereo image.

In a step 620, an initial segmentation of the stereo image is performed to determine an initial foreground stereo image. Step 620 may utilize stereo image segmentation methods known in the art. For example, step 620 may form the foreground stereo image from a statistically optimal foreground versus background segmentation of the stereo image based upon cues extracted from the image. Such cues may include one or more of stereo cues, i.e., stereo disparity related information, color cues, i.e., color information extracted from the stereo image, and contrast cues, i.e., image contrast related information extracted from the stereo image. An optimization function, including one or more types of cues, is optimized to determine the statistically most probable segmentation using optimization methods known in the art of stereo image segmentation, such as layered dynamic programming and graph cuts.

In an embodiment, step 620 includes a step 622, wherein stereo cues and contrast cues are considered. Regarding stereo cues, a stereo disparity based similarity measure is constructed. For a given pixel p, in either the left-view image or the right-view image of the stereo image, a neighborhood around pixel p is considered. The number $N_F$ of pixels in the neighborhood having stereo disparity in the interval $[N_0, N_1-1]$, where $N_1-1$ is the maximum stereo disparity of all pixels of the stereo image, is compared to the number $N_B$ of pixels in the neighborhood having stereo disparity in the interval $[0, N_0[$. The ratio $N_F/N_B$ is a similarity measure for pixel p. The greater the value of $N_F/N_B$, the more likely it is that pixel p belongs to the foreground. Regarding contrast cues, pairs of neighboring pixels are considered. A pixel pair composed of a foreground pixel and a background pixel most likely exhibits a larger relative contrast than a pixel pair composed of two background pixels or two foreground pixels. This embodiment of step 620 optimizes an optimization function that incorporates both stereo cues and contrast cues as described in the above. Hence, when optimizing the optimization function, stereo cues and contrast cues are considered simultaneously to provide an initial segmentation of the stereo image between a foreground and a background. The foreground thus determined is represented in an initial foreground stereo image.

In a step 630, occlusion-related errors in the initial foreground stereo image are reduced or eliminated to determine a foreground stereo image of the stereo image received in step 610. Step 630 serves to improve the foreground versus background classification of pixels associated with features visible only the left-view image or only in the right-view image of the stereo image. Such pixels may not be correctly evaluated by stereo and contrast cue based embodiments of step 620, since the stereo disparity calculation may be unreliable for occluded pixels.

In an embodiment, step 630 includes steps 632, 634, 636, and 638 for reducing or eliminating occlusion-related errors in the initial foreground stereo image. Step 632 invokes the assumption that a left boundary of the right view image of the initial foreground stereo image is correct, since this boundary is most likely occlusion-free. Similarly, step 634 invokes the assumption that a right boundary of the left view image of the initial foreground stereo image is correct, since this boundary is most likely occlusion-free. In step 636, a color distribution model for the stereo image is generated using the assumptions invoked in steps 632 and 634. The color distribution model enables the construction of an optimization function that includes color cues. Color cues are similar to contrast cues except for being color based. In step 638, the initial segmentation performed in step 620 is refined by applying an optimization function that utilizes the color distribution model, color cues, and contrast cues to determine a foreground stereo image. This foreground stereo image is less subject to occlusion-related errors than the initial foreground stereo image determined in step 620.

In one example, method 600 is executed by processing center 500 (FIG. 5) to perform step 330 of method 300 (FIG. 3). In step 610, processing center 500 receives source stereo image 121 (FIG. 1), captured by first stereo camera 111 (FIG. 1), through interface 260 (FIGS. 2 and 5) and stores source stereo image 121 to image data storage 246 (FIGS. 2 and 5). In step 612, processing center 500 receives, from step 320 of method 300 (FIG. 3), the minimum stereo disparity $N_0$ and stores this value to stereo disparity search range 248 (FIGS. 2 and 5). In step 620, processor 220 retrieves source stereo image 121 and minimum stereo disparity $N_0$ from image data storage 246 and stereo disparity search range 248. Utilizing cost function 552 (FIG. 5), cues from cues 555 (FIG. 5), and minimum stereo disparity $N_0$, processor 220 executes initial segmentation instructions 550 (FIG. 5) on source stereo image 121 to determine an initial foreground stereo image. Cost function 552 may be based upon stereo and contrast cues as discussed above in connection with step 622 and 620. Processor 220 stores the initial foreground stereo image to image data storage 246. In step 630, processor 220 retrieves the initial foreground stereo image from image data storage 246 and executes refined segmentation instructions 560 (FIG. 5) on the initial foreground stereo image to reduce or eliminate occlusion-related errors. This results in the determination of foreground stereo image 410 (FIG. 4). In steps 632 and 634, processor 220 executes assumptions 562 (FIG. 5) used by processor 220 in step 636 to generate a color distribution model. Processor 220 stores the color distribution model to color distribution model 522 (FIG. 5). In step 638, processor 220 optimizes cost function 564 (FIG. 5) using color distribution module 522, and color and contrast cues from cues 555, to determine foreground stereo image 410 (FIG. 4).

In another example, method 600 is executed by processing center 500 to perform step 316 of method 300 (FIG. 3). In step 610, processing center 500 receives target stereo image 122 (FIG. 1), captured by second stereo camera 112 (FIG. 1), through interface 260 (FIGS. 2 and 5) and stores target stereo image 122 to image data storage 246 (FIGS. 2 and 5). In step 612, processing center 500 receives, from step 332 of method 300 (FIG. 3), the minimum stereo disparity N'$_0$ and stores this value to stereo disparity search range 248 (FIGS. 2 and 5). In step 620, processor 220 retrieves target stereo image 122 and minimum stereo disparity N'$_0$ from image data storage 246 and stereo disparity search range 248. Utilizing cost function 552 (FIG. 5), cues from cues 555 (FIG. 5), and minimum stereo disparity N'$_0$, processor 220 executes initial segmentation instructions 550 (FIG. 5) on target stereo image 121 to determine an initial very-near foreground stereo image. Cost function 552 may be based upon stereo and contrast cues as discussed above in connection with step 622 and 620. Processor 220 stores the initial foreground stereo image to image data storage 246. In step 630, processor 220 retrieves the initial very-near foreground stereo image from image data storage 246 and executes refined segmentation instructions 560 (FIG. 5) on the initial very-near foreground stereo image to reduce or eliminate occlusion-related errors. This results in the determination of very-near foreground stereo image 420 (FIG. 4). In steps 632 and 634, processor 220 executes assumptions 562 (FIG. 5) used by processor 220 in step 636 to generate a color distribution model. Processor 220 stores the color distribution model to color distribution model 522 (FIG. 5). In step 638, processor 220 optimizes cost function 564 (FIG. 5) using color distribution module 522, and color and contrast cues from cues 555, to determine very-near foreground stereo image 420 (FIG. 4).

Figure 7:
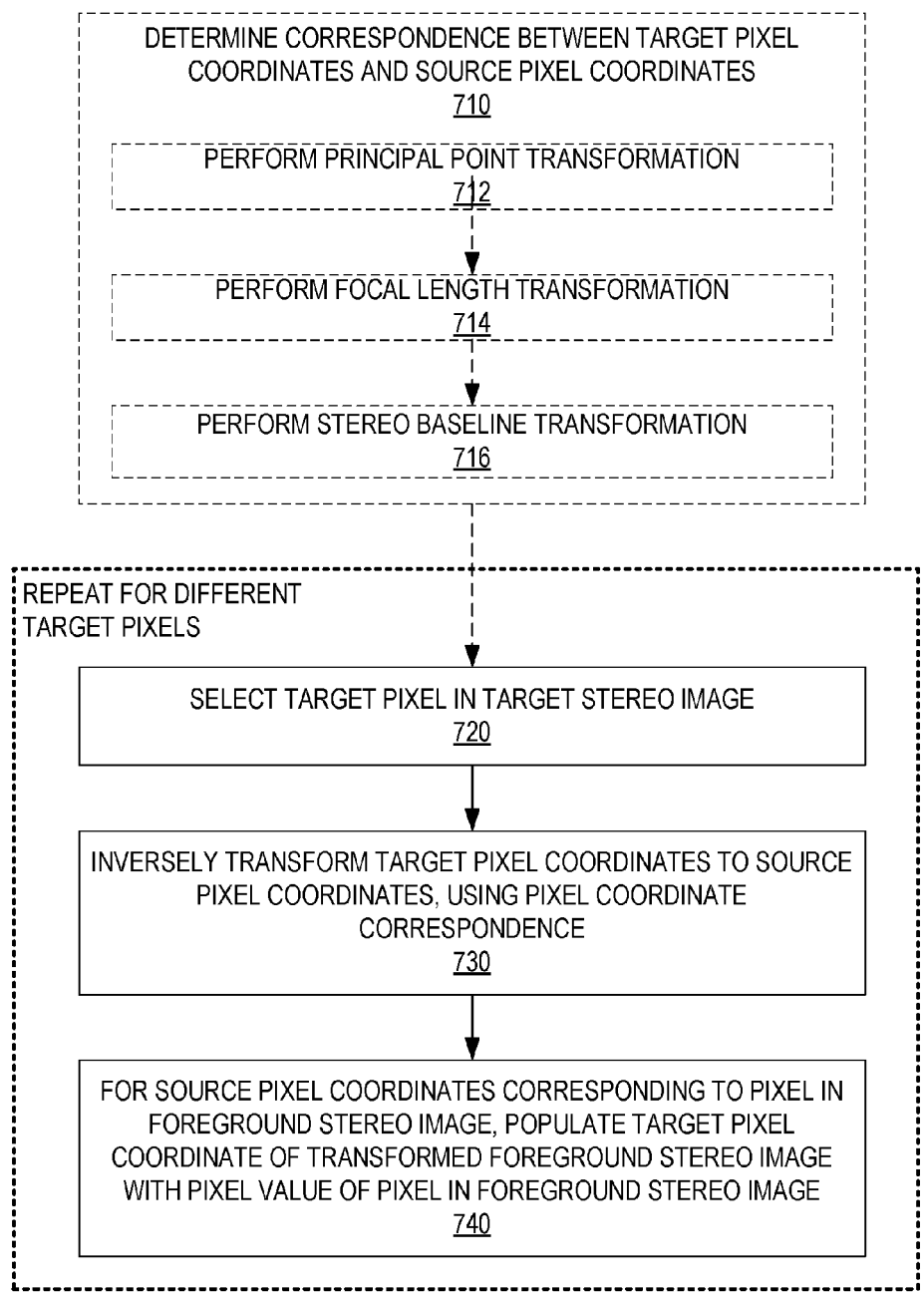
FIG. 7 illustrates one method for transforming a foreground stereo image, extracted from a source stereo image captured by a first stereo camera, from the scale associated with the first stereo camera to the scale associated with a second stereo camera, according to an embodiment.

FIG. 7 illustrates one exemplary method 700 for transforming a foreground stereo image, extracted from a source stereo image captured by a first stereo camera, from the scale associated with the first stereo camera to the scale associated with a second stereo camera. Method 700 may be implemented in method 300 (FIG. 3) as an embodiment of step 340 (FIG. 3). Furthermore, processing center 500 (FIG. 5) may implement method 700 as transformation instructions 570.

In an optional step 710, the correspondence between target pixel coordinates and source pixel coordinates is determined. Target pixel coordinates refer to coordinates of pixels in the target stereo image, while source pixel coordinates refer to coordinates of pixels in the source stereo image. Step 710 generates a correspondence that expresses target pixel coordinates as a function of source pixel coordinates. This correspondence specifies how to transform the foreground stereo image to provide a transformed foreground stereo image with proper depth and two-dimensional scale for embedding into the target stereo image.

Figure 8:
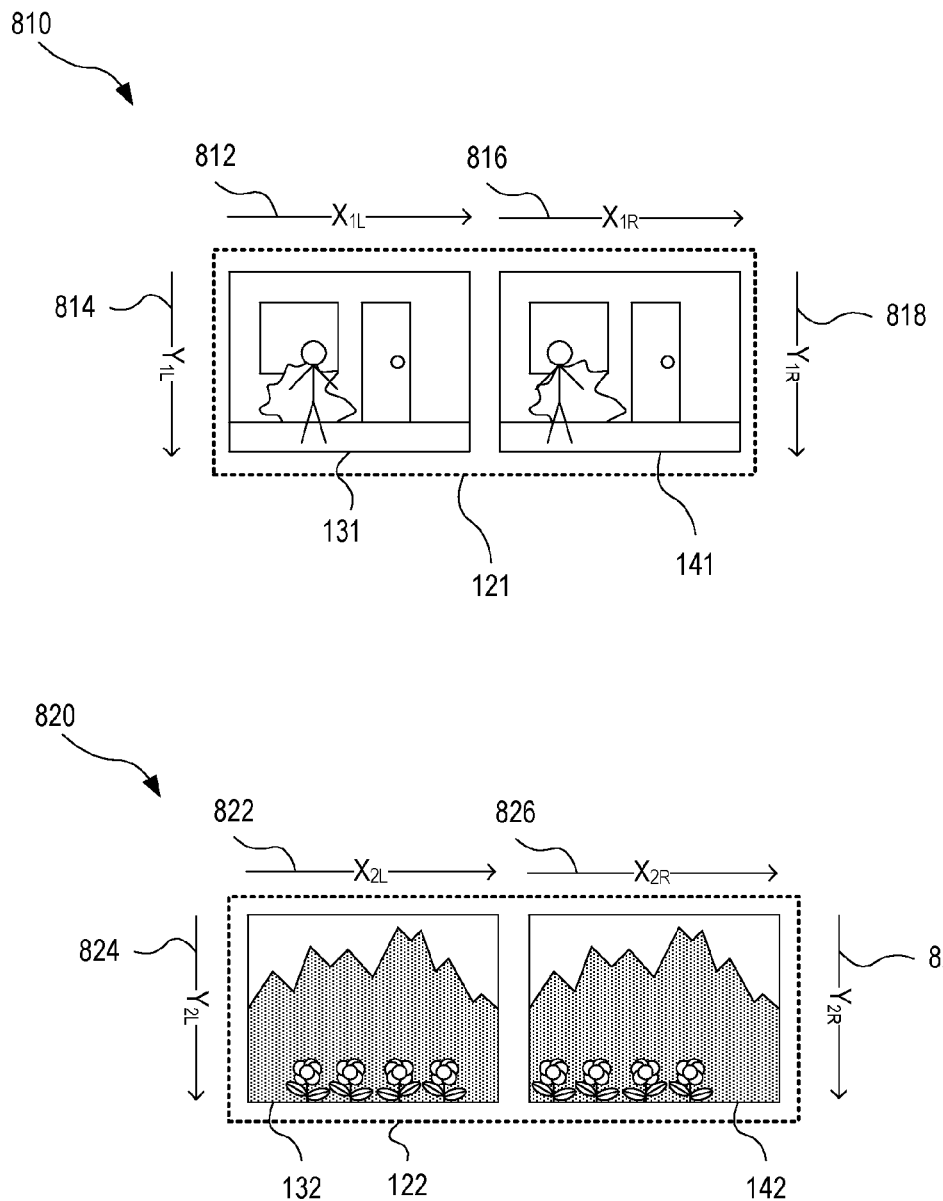
FIG. 8 shows exemplary stereo images associated with the method of FIG. 7.

For example, as illustrated in FIG. 8, source pixel coordinates $(x_{1L}, y_{1L})$ of a feature in left-view image 131 (FIG. 1) of source stereo image 121 (FIG. 1) and corresponding source pixel coordinates $(x_{1R}, y_{1R})$ of the same feature in right-view image 141 (FIG. 1) are transformed to respective target pixel coordinates $(x_{2L}, y_{2L})$ of left-view image 132 (FIG. 1) and $(x_{2R}, y_{2R})$ of right-view image 142 (FIG. 1) of target stereo image 122 (FIG. 1). Coordinates $x_{1L}, y_{1L}, x_{1R}, y_{1R}, x_{2L}, y_{2L}, x_{2R}$, and $y_{2R}$ are indicated by coordinate axes 812, 814, 816, 818, 822, 824, 826, 828, respectively.

Referring again to FIG. 7, in an embodiment, the first and second stereo cameras are rectified to frontal parallel setting and optional step 710 includes sequential steps 712, 714, and 716 for determining the target-to-source pixel coordinate correspondence. Step 710 may be performed by processing system 500 (FIG. 5) or by another computer. For example, processor 220 retrieves first stereo camera parameters 242 and second stereo camera parameters 244, and executes a portion of transformation instructions to determine the target-to-source pixel coordinate correspondence.

In step 712, a principal point transformation of source pixel coordinates is performed. The source pixel coordinates are transformed from the principal point location of the first stereo camera to the principal point location of the second stereo camera. Consider a feature of the source stereo image having source pixel coordinates $(x_{1L}, y_{1L})$ in the left-view image of the source stereo image and corresponding source pixel coordinates $(x_{1R}, y_{1R})$ in the right-view image of the source stereo image. This feature is, for example, a feature in source stereo image 121 (FIG. 1) that appears at coordinates $(x_{1L}, y_{1L})$ in left-view image 131 (FIG. 1) and coordinates $(x_{1L}, y_{1L})$ in left-view image 132 (FIG. 1). The principal point transformed pixel coordinates $(x'_L, y'_L)$ and $(x'_R, y'_R)$ in the left and right view, respectively, may be expressed as $$\begin{pmatrix} x'_L \\ y'_L \end{pmatrix} = \begin{pmatrix} x_{1L} \\ y_{1L} \end{pmatrix} + \begin{pmatrix} c_{x2} - c_{x1} \\ c_{y2} - c_{y1} \end{pmatrix},$$

and $$\begin{pmatrix} x'_R \\ y'_R \end{pmatrix} = \begin{pmatrix} x_{1R} \\ y_{1R} \end{pmatrix} + \begin{pmatrix} c_{x2} - c_{x1} \\ c_{y2} - c_{y1} \end{pmatrix},$$

where the principal point location in the first and second stereo cameras are $(c_{x1}, c_{y1})$ and $(c_{x2}, c_{y2})$, respectively.

In step 714, a focal length transformation of the pixel coordinates $(x'_L, y'_L)$ and $(x'_R, y'_R)$ is performed to produce pixel coordinates $$\begin{pmatrix} x''_L \\ y''_L \end{pmatrix} = \frac{f_2}{f_1} \left[ \begin{pmatrix} x'_L \\ y'_L \end{pmatrix} - \begin{pmatrix} c_{x2} \\ c_{y2} \end{pmatrix} \right] + \begin{pmatrix} c_{x2} \\ c_{y2} \end{pmatrix},$$

and $$\begin{pmatrix} x''_R \\ y''_R \end{pmatrix} = \frac{f_2}{f_1} \left[ \begin{pmatrix} x'_R \\ y'_R \end{pmatrix} - \begin{pmatrix} c_{x2} \\ c_{y2} \end{pmatrix} \right] + \begin{pmatrix} c_{x2} \\ c_{y2} \end{pmatrix},$$

where $f_1$ and $f_2$ are the focal lengths of the first and second stereo cameras, respectively.

In step 716, a stereo baseline transformation is performed on pixel coordinates $(x'_L, y'_L)$ and $(x'_R, y'_R)$. Since a change in stereo baseline of a stereo camera is associated with a change in optical center of at least one of the two individual cameras included therein, stereo baseline changes may change occlusion relationships. It is therefore not always possible to directly map a set of pixel coordinates to a stereo baseline transformed counterpart. Step 716 assumes that the foreground of the source stereo image is planar and has a constant distance to the first stereo camera. This is a good approximation in many applications. In accordance with this assumption, the depth of the foreground of the source stereo image $z_{fg}$ is approximated as $$z_{fg} \approx \frac{f_1 T_1}{(\alpha + \beta)/2},$$

where $T_1$ is the stereo baseline of the first stereo camera, $\alpha$ is the minimum stereo disparity of the foreground stereo image, and $\beta$ is the maximum stereo disparity of the foreground stereo image. Accordingly, the target pixel coordinates $(x_{2L}, y_{2L})$ of the left-view image of the target stereo image and $(x_{2L}, y_{2L})$ of the right-view image of the target stereo image may be expressed as $$\begin{pmatrix} x_{2L} \\ y_{2L} \end{pmatrix} = \begin{pmatrix} x_L'' + \frac{f_2}{z_{fg}} \frac{T_2 - T_1}{2} \\ y_L'' \end{pmatrix},$$

and $$\begin{pmatrix} x_{2R} \\ y_{2R} \end{pmatrix} = \begin{pmatrix} x_R'' + \frac{f_2}{z_{fg}} \frac{T_2 - T_1}{2} \\ y_R'' \end{pmatrix},$$

where $T_2$ is the stereo baseline of the first stereo camera.

In an embodiment of method 700, to avoid non-mapped pixels, transformation of the foreground stereo image to the scale of the target stereo image is performed using an inverse transformation, wherein source pixel coordinates are expressed as a function of target pixel coordinates:

$$\begin{pmatrix} x_{1L} \\ y_{1L} \end{pmatrix} = \begin{pmatrix} \frac{f_1}{f_2} \left[ x_{2L} - \frac{f_2}{z_{fg}} \frac{T_2 - T_1}{2} - c_{x2} \right] + c_{x1} \\ \frac{f_1}{f_2} [y_{2L} - c_{y2}] + c_{y1} \end{pmatrix},$$

and $$\begin{pmatrix} x_{1R} \\ y_{1R} \end{pmatrix} = \begin{pmatrix} \frac{f_1}{f_2} \left[ x_{2R} + \frac{f_2}{z_{fg}} \frac{T_2 - T_1}{2} - c_{x2} \right] + c_{x1} \\ \frac{f_1}{f_2} [y_{2R} - c_{y2}] + c_{y1} \end{pmatrix}.$$

This inverse transformation correspondence may be included in processing center 500 (FIG. 5) as pixel coordinate correspondence 572 (FIG. 5). In one example, first stereo camera parameters $c_{x1}$, $c_{y1}$, $f_1$, and $T_1$ are stored in first stereo camera parameters 242 (FIGS. 2 and 5), while second stereo camera parameters $c_{x2}$, $c_{y2}$, $f_2$, and $T_2$ are stored in second stereo camera parameters 244 (FIGS. 2 and 5). Processor 220 (FIGS. 2 and 5) may then construct the source-to-target pixel coordinate correspondence, according to transformation instructions 570 (FIG. 5), by retrieving first stereo camera parameters 242, second stereo camera parameters 244, and pixel coordinate correspondence 572. In another example, first stereo camera parameters $c_{x1}$, $c_{y1}$, $f_1$, and $T_1$ and second stereo camera parameters $c_{x2}$, $c_{y2}$, $f_2$, and $T_2$ are encoded in pixel coordinate correspondence 572.

In a step 720, a target pixel of the target stereo image is selected. For example, processor 220 of processing center 500 may retrieve target stereo image 122 (FIGS. 1 and 8), or related pixel information, from image data storage 246 (FIGS. 2 and 5) and execute transformation instructions 570 (FIG. 5) to select a target pixel of target stereo image 122. In a step 730, the target pixel coordinates of the target pixel stereo image are inversely transformed to source pixel coordinates. For example, processor 220 of processing center 500 executes pixel coordinate correspondence 572 on the target pixel selected in step 720. In an embodiment, step 730 utilizes the inverse transformation correspondence derived above in connection with steps 712, 714, and 716. In a step 740, for source pixel coordinates belonging to the foreground stereo image extracted from the source stereo image, the target pixel selected in step 720 is populated with the pixel value of the foreground stereo image. For example, processor 220 of processing center 500 retrieves foreground stereo image 410 (FIG. 4) from image data storage 246 and executes transformation instructions 570 to evaluate if the source stereo pixel is within foreground 151 (FIGS. 1 and 4). If the source stereo pixel is within foreground 151, the pixel of transformed foreground stereo image 410' (FIG. 4), having the target pixel coordinates selected in step 720, is populated with the corresponding pixel value of the foreground stereo image.

Steps 720, 730, and 740 are repeated for all pixels of the target stereo image, or for all pixels of the target stereo image corresponding to source stereo pixels of the foreground stereo image. Steps 720, 730, and 740 thus generate the transformed foreground stereo image, such as transformed foreground stereo image 410'. In an example, processor 220 of processing center 500 thus generates transformed foreground stereo image 410' and stores transformed foreground stereo image 410' to image data storage 246.

Figure 9:
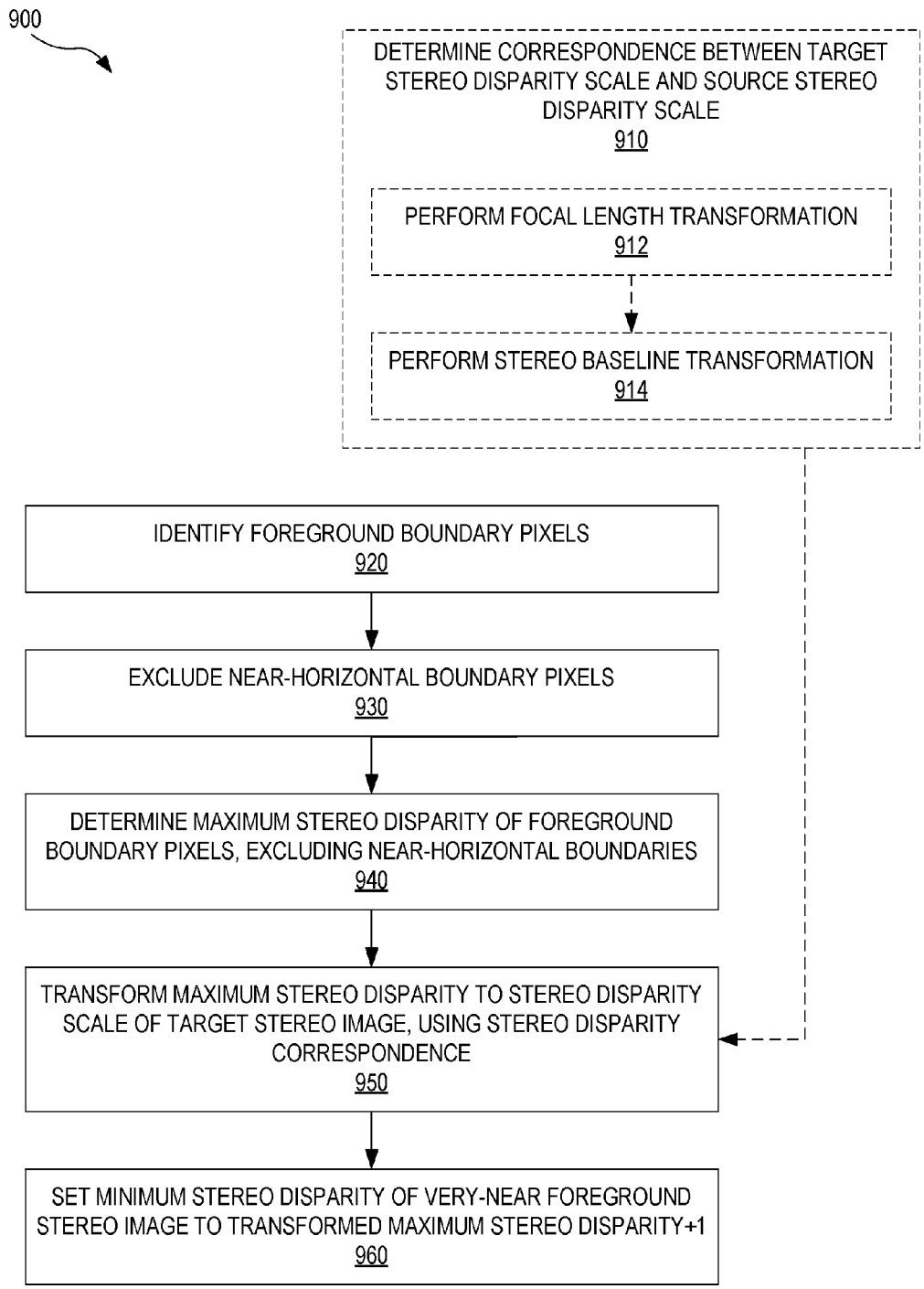
FIG. 9 illustrates one method for determining the minimum stereo disparity of a very-near foreground of a target stereo image, captured by a second stereo camera, according to an embodiment.

FIG. 9 illustrates one exemplary method 900 for determining the minimum stereo disparity of a very-near foreground of a target stereo image, captured by a second stereo camera, by refining the determination of the maximum stereo disparity of a foreground of a source stereo image captured by a first stereo camera. Method 900 may be implemented in method 300 (FIG. 3) as an embodiment of step 332 (FIG. 3). Furthermore, processing center 500 (FIG. 5) may implement method 900 as stereo disparity range refinement instructions 580.

In an optional step 910, the correspondence between stereo disparity $\alpha_2$ of the target stereo image and stereo disparity $\alpha_1$ of the source stereo image is determined. In an embodiment, step 910 includes sequential steps 912 and 914. In step 912, stereo disparity $\alpha_1$ is transformed from the focal length $f_1$ of the first stereo camera to the focal length $f_2$ of the second stereo camera to yield a focal-length transformed stereo disparity $\alpha' = (f_2/f_1) \times \alpha_1$. In step 914, the focal-length transformed stereo disparity is transformed from the stereo baseline $T_1$ of the first stereo camera to the stereo baseline $T_2$ of the second stereo camera to complete the transformation of $\alpha_1$ to $\alpha_2$. Step 914 assumes that the foreground of the source stereo image is planar and has a constant distance to the first stereo camera. This is a good approximation in many applications. The transformed stereo disparity may be expressed as $\alpha_2 = (T_2/T_1)(f_2/f_1) \times \alpha_1$. This correspondence may be included in processing center 500 (FIG. 5) as stereo disparity correspondence 574 (FIG. 5). In one example, first stereo camera parameters $f_1$ and $T_1$ are stored in first stereo camera parameters 242 (FIGS. 2 and 5), while second stereo camera parameters $f_2$ and $T_2$ are stored in second stereo camera parameters 244 (FIGS. 2 and 5). Processor 220 (FIGS. 2 and 5) may then construct the stereo disparity correspondence, according to transformation instructions 570 (FIG. 5), by retrieving first stereo camera parameters 242, second stereo camera parameters 244, and stereo disparity correspondence 574. In another example, first stereo camera parameters $f_1$ and $T_1$ and second stereo camera parameters $f_2$ and $T_2$ are encoded in stereo disparity correspondence 574.

In a step 920, boundary pixels of the foreground stereo image extracted from the source stereo image are identified. For example, processor 220 of processing center 500 retrieves foreground stereo image 410 (FIG. 4) from image data storage 246 (FIGS. 2 and 5) and executes a portion of stereo disparity range refinement instructions 580 to identify boundary pixels of foreground stereo image 410.

In a step 930, pixels on near-horizontal boundaries are excluded from the selection generated in step 920, where horizontal refers to the direction parallel to the stereo baseline of the first stereo camera. The purpose of step 930 is to minimize influence of errors in the calibration of the first stereo camera. Such calibration errors are more likely to affect stereo disparity calculations along horizontal boundaries than along vertical boundaries. Hence, step 930 biases the selection of boundary pixels, considered by method 900, towards vertical boundaries. In one embodiment, step 930 excludes pixels located along substantially horizontal boundaries. In another embodiment, step 930 excludes pixels located along boundaries that are more horizontal than vertical. Step 930 may be implemented in processing center 500 as vertical edge matching instructions 582 (FIG. 5), such that processor 220 of processing center 500 may execute vertical edge matching instructions 582 to refine the selection of pixels identified in step 920.

In a step 940, the maximum stereo disparity is determined for boundary pixels belonging to the selection produced in step 930. For example, processor 220 of processing center 500 executes a portion of stereo disparity range refinement instructions 580 to determine the maximum stereo disparity of the boundary pixels selected in step 930.

In a step 950, the maximum stereo disparity determined in step 940 is transformed from the scale of the source stereo image to the scale of the target stereo image, using a stereo disparity correspondence between the first and second stereo cameras, such as the correspondence determined in step 910. For example, processor 220 executes a portion of stereo disparity range refinement instructions 580, together with stereo disparity correspondence 574 (FIG. 5), to generate a transformed maximum stereo disparity $N_1-1$.

In a step 960, the minimum stereo disparity $N'_0$ of the very-near foreground of the target stereo image is defined as $N'_0=(N_1-1)+1=N_1$. For example, processor 220 of processing center 500, executes a portion of stereo disparity range refinement instructions 580 to generate the minimum stereo disparity $N'_0$. Processor 220 then stores this value to stereo disparity search range 248 (FIGS. 2 and 5).

Figure 10:
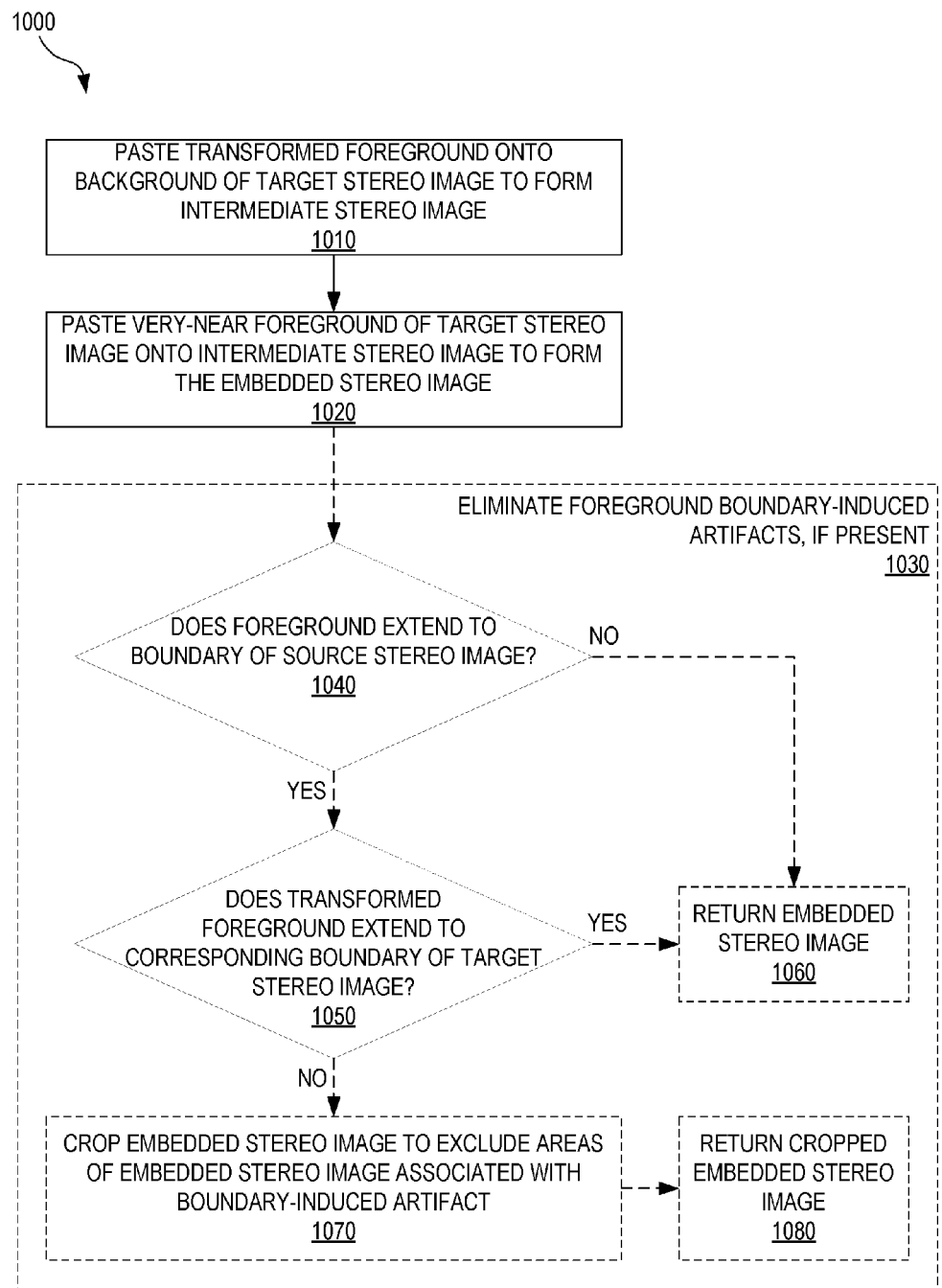
FIG. 10 illustrates one method for embedding a foreground stereo image, extracted from a source stereo image captured by a first stereo camera, into a target stereo image captured by a second stereo camera, according to an embodiment.

FIG. 10 illustrates one exemplary method 1000 for embedding a foreground stereo image, extracted from a source stereo image captured by a first stereo camera, into a target stereo image captured by a second stereo camera. Method 1000 may be implemented in method 300 (FIG. 3) as an embodiment of step 350 (FIG. 3). Furthermore, processing center 500 (FIG. 5) may implement method 1000 as embedding instructions 590.

In a step 1010, the transformed foreground from the source stereo image, transformed to the scale of the target stereo image, is pasted onto the background of the target stereo image. For example, processor 220 of processing center 500 retrieves transformed foreground stereo image 410' (FIG. 4) and background stereo image 430 (FIG. 4) from image data storage 246 (FIGS. 2 and 5), and executes a portion of embedding instructions 590 to paste foreground 151' (FIGS. 1 and 4) onto background stereo image 430 (FIG. 4). This generates an intermediate stereo image 440 shown in FIG. 4. Intermediate stereo image 440 of FIG. 4 is represented by a left-view image 442 and a right-view image 444, which show foreground 151' layered on top of background 153 (FIGS. 1 and 4). Processor 220 then stores intermediate stereo image 440 to image data storage 246.

In a step 1020, the very-near foreground of the target stereo image is pasted onto the intermediate stereo image generated in step 1010 to produce the embedded stereo image. The very-near foreground of the target stereo image includes objects in the scene captured in the target stereo image, which are closer to the second stereo camera than objects of the foreground stereo image are to the first stereo camera. In an example of step 1020, processor 220 of processing center 500 retrieves intermediate stereo image 440 (FIG. 4) and very-near foreground stereo image 420 (FIG. 4) from image data storage 246 (FIGS. 2 and 5), and executes a portion of embedding instructions 590 to paste very-near foreground 152 (FIGS. 1 and 4) onto intermediate stereo image 440 (FIG. 4). This generates embedded stereo image 170 (FIG. 1). Processor 220 may store embedded stereo image 170 to image data storage 246, forward embedded stereo image 170 to step 360 of method 300 (FIG. 3), or forward embedded stereo image 170 to an optional sub-method 1030 discussed below. If there is no very-near foreground in the target stereo image, step 1020 is omitted from method 1000, without departing from the scope hereof.

In an embodiment, method 1000 includes a sub-method 1030 that eliminates boundary-induced image artifacts in the embedded stereo image if such effects are present. Such boundary-induced artifacts may occur in scenarios where the foreground of the source stereo image extends to a boundary of the source stereo image. Method 1000 evaluates the extents of the foreground stereo image and the target stereo image and crops the embedded stereo image, if necessary, to eliminate the boundary-induce artifacts. This embodiment of method 1000 may be implemented in method 300 (FIG. 3) as an embodiment of step 350 (FIG. 3). Furthermore, processing center 500 (FIG. 5) may implement this embodiment of method 1000 as embedding instructions 590 with sub-method 1030 implemented as cropping instructions 592 (FIG. 5).

Figure 11:
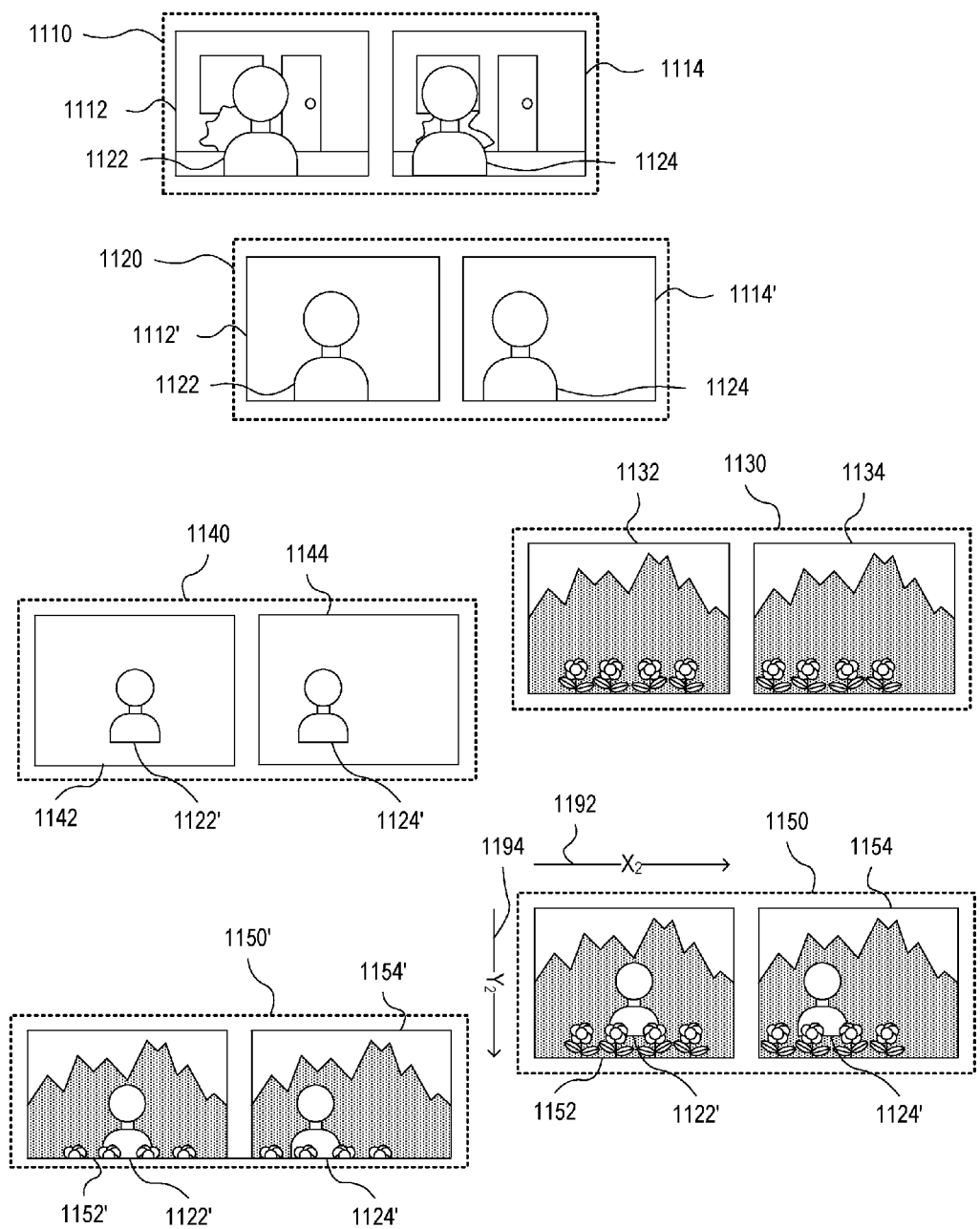
FIG. 11 shows exemplary stereo images associated with the method of FIG. 10.

FIG. 11 shows exemplary stereo images that illustrate one exemplary form of the boundary-induced artifacts considered by method 1000 (FIG. 10) as well as the solution imposed by method 1000.

A source stereo image 1110 is represented by a left-view image 1112 and a right-view image 1114. Left-view stereo image 1112 includes a foreground 1122. Right-view stereo image 1114 includes a corresponding foreground 1124.

A foreground stereo image 1120 is represented by a left-view image 1112' and a right-view image 1114'. Left-view stereo image 1112' includes a foreground 1122. Right-view stereo image 1114' includes a corresponding foreground 1124. Foreground stereo image 1120 is generated using, for example, step 330 of method 300 (FIG. 3).

A target stereo image 1130 is represented by a left-view stereo image 1132 and a right-view stereo image 1134.

A transformed foreground stereo image 1140 shows the foreground of source stereo image 1110 transformed to the scale of target stereo image 1130. Transformed foreground stereo image 1140 is represented by a left-view image 1142 and a right-view image 1144, and is generated using, for example, step 340 of method 300 (FIG. 3). Left-view stereo image 1142 includes a transformed foreground 1122', which is foreground 1122 transformed to the scale of target stereo image 1130. Right-view stereo image 1114 includes a corresponding transformed foreground 1124', which is foreground 1124 transformed to the scale of target stereo image 1130.

An uncropped, embedded stereo image 1150 is represented by a left-view image 1152 and a right-view image 1154. Uncropped, embedded stereo image 1154 is generated from transformed foreground stereo image 1140 and target stereo image 1130, for example according to steps 1010 and 1020 of method 1000 (FIG. 10). Left-view stereo image 1152 includes transformed foreground 1122' embedded in left-view image 1132. Right-view stereo image 1154 includes transformed foreground 1124' embedded in right-view image 1134. Transformed foregrounds 1122' and 1124' are, for example, generated using method 700 of FIG. 7. Transformed foregrounds 1122' and 1124' are subject to a boundary-induced artifact and appear to be floating in the scene.

An embedded stereo image 1150' is a cropped version of uncropped, embedded stereo image 1150, which eliminates the boundary-induced artifact of uncropped, embedded stereo image 1150. Embedded stereo image 1150' is represented by a left-view image 1152' and a right-view image 1154', which are cropped versions of left-view image 1152 and a right-view image 1154. Left-view stereo image 1152' includes transformed foreground 1122', and right-view stereo image 1154' includes corresponding transformed foreground 1124', now without boundary-induced artifacts.

All stereo images of FIG. 11 are assumed to be generated by stereo cameras rectified to frontal parallel setting, wherein the two individual cameras within the stereo camera are offset from each other in a direction parallel to the horizontal axis of the stereo images. This direction is indicated by horizontal direction 1192. Accordingly, epipolar lines are parallel to horizontal direction 1192, such that a feature in a left-view image is shifted from the same feature in the right-view image only along horizontal direction 1192, if at all.

In the following, sub-method 1030 of method 1000 (FIG. 10) is described together with examples relating to the stereo images of FIG. 11. In a step 1040, sub-method 1030 evaluates if the foreground of the source stereo image extends to a boundary of the source stereo image. If the foreground extends to one or more boundary of the source stereo image, sub-method 1030 proceeds to a step 1050 for further evaluation of such boundaries. Otherwise, sub-method 1030 proceeds to a step 1060, wherein sub-method 1030 returns the embedded stereo image generated in step 1020 as the output of method 1000.

In an example of step 1040, processor 220 retrieves foreground stereo image 410 (FIG. 4) from image data storage 246 and executes a portion of cropping instructions 592 to evaluate if one, both, or none of foreground 1122 and foreground 1124 extend to a boundary of left-view image 1112' and right-view image 1114', respectively. In the example of foregrounds 1122 and 1124, foreground 1122 extends to the bottom boundary of left-view image 1112' and foreground 1124 extends to the bottom boundary of right-view stereo image 1114'. Hence, in this example, sub-method 1030 proceeds to step 1050.

In step 1050, sub-method 1030 evaluates if the transformed foreground stereo image extends to one or more boundaries of the target stereo image, which correspond to respective boundaries identified in step 1040. For example, if the foreground extends to the left and bottom boundaries of the left- and right-view images of the source stereo image, step 1050 evaluates if the transformed foreground extends to the left and bottom boundaries of the left- and right-view images of the target stereo image. In embodiments, wherein the left- and right-view images of the transformed foreground stereo image are constructed to have the same extent as the left- and right-view images of the target stereo image, step 1050 may evaluate if the transformed foreground extends to the relevant boundaries of the transformed foreground stereo image. If the transformed foreground extends to boundaries of the target stereo image, corresponding to boundaries identified in step 1040, the embedded stereo image generated in steps 1010 and 1020 is free of boundary-related artifacts, in which case sub-method 1030 proceeds to step 1050. If, on the other hand, the transformed foreground does not extend to all of the boundaries of the target stereo image, corresponding to boundaries identified in step 1040, sub-method 1030 proceeds to a step 1060 for mitigating of boundary-related artifacts associated with one or more of those boundaries.

In one example of step 1050, processor 220 retrieves transformed foreground stereo image 1140 from image data storage and executes a portion of cropping instructions 592 to evaluate (a) if transformed foreground 1122' extends to the bottom boundary of left-view image 1142 and (b) if transformed foreground 1124' extends to the bottom boundary of right-view stereo image 1144. In this example, left- and right-view stereo images 1142 and 1144 have extent identical to left- and right-view stereo images 1132 and 1134, respectively, of target stereo image 1130. Neither of transformed foregrounds 1122' and 1124' extend to the respective bottom boundaries of left-view image 1142 and right-view image 1144. Therefore, transformed foregrounds 1122' and 1124' are subject to a boundary-related artifact and appear to hover in embedded stereo image 1150, thus providing an unnatural looking embedded stereo image.

In step 1070, the embedded stereo image generated by steps 1010 and 1020, is cropped to exclude areas of the embedded stereo image that are associated with boundary-induced artifacts. Step 1070 crops the embedded stereo image such that boundaries associated with a boundary-induced artifact are moved to a location that coincide with the boundary of the transformed foreground. Such boundaries, identified in step 1050, are left, right, top, or bottom boundaries in the right-view and/or left-view images that limit the extent of the foreground in the foreground stereo image but, in the target stereo image, are located beyond the extent of the transformed foreground image. An uncropped embedded stereo image one or several boundaries that are associated with boundary-induced artifacts. Each boundary may be separately considered and cropped in step 1070.

In one example of step 1070, processor 220 retrieves embedded stereo image 1150 from image data storage and executes cropping instructions 592 to identify the vertical location, along a vertical direction 1194 in embedded stereo image 1150, at which the transformed foregrounds 1122' and 1124' are limited by the bottom boundary of source stereo image 1110. Processor 220 proceeds to crop both left-view image 1152 and right-view image 1154, at the vertical location corresponding to the limit of transformed foreground 1152, to produce cropped, embedded stereo image 1150' that does not include data below this vertical location.

In another example of step 1070, not illustrated in FIG. 11, foregrounds 1122 and 1124 of source stereo image 1110 extends to the top boundary of source stereo image 1110, while transformed foregrounds 1122' and 1124' do not extend to the top boundary of target stereo image 1130. In this case, embedded stereo image 1150 is cropped to produce a cropped, embedded stereo image 1150' having left- and right-view images 1152' and 1154' that do not include data above the vertical location associated with the foreground limit.

In yet another example of step 1070, foreground 1122 is cropped by a left boundary of left-view image 1112 and/or foreground 1124 is cropped by a left boundary of right-view image 1114. In this case, embedded stereo image 1150 is cropped at a horizontal location $x_{crop}=\max(x_{2L}, x_{2R})$, where $x_{2L}$ is the location of the boundary of transformed foreground 1122' in left-view image 1152 and $x_{2R}$ is the location of the boundary of transformed foreground 1124' in right-view image 1154. Coordinates $x_{2L}$ and $x_{2R}$ are defined according to horizontal axis 1192. The crop results in cropped, embedded stereo image 1150' having left-view image 1152' and right-view image 1154' with respective left boundaries located at $x_{crop}$. Neither left-view image 1152' nor right-view image 1154' will show the boundary-induced artifact associated with the left boundary.

In a similar example of step 1070, foreground 1122 is cropped by a right boundary of left-view image 1112 and/or foreground 1124 is cropped by a right boundary of right-view image 1114. In this case, embedded stereo image 1150 is cropped at a horizontal location $x_{crop}=\min(x_{2L}, x_{2R})$, where $x_{2L}$ is the location of the boundary of transformed foreground 1122' in left-view image 1152 and $x_{2R}$ is the location of the boundary of transformed foreground 1124' in right-view image 1154. Coordinates $x_{2L}$ and $x_{2R}$ are defined according to horizontal axis 1192. The crop results in cropped, embedded stereo image 1150' having left-view image 1152' and right-view image 1154' with respective right boundaries located at $x_{crop}$. Neither left-view image 1152' nor right-view image 1154' will show the boundary-induced artifact associated with the right boundary.

In step 1080, sub-method 1030 returns the cropped, embedded stereo image generated in step 1070 as the output of method 1000. For example, processor 220 forwards cropped, embedded stereo image 1150' to step 360 of method 300 (FIG. 3).

Combinations of Features

Features described above as well as those claimed below may be combined in various ways without departing from the scope hereof. For example, it will be appreciated that aspects of one system or method for embedding stereo imagery described herein may incorporate or swap features of another system or method for embedding stereo imagery described herein. The following examples illustrate some possible, non-limiting combinations of embodiments described above. It should be clear that many other changes and modifications may be made to the methods and device herein without departing from the spirit and scope of this invention:

(A1) A method for embedding stereo imagery may include transforming a foreground stereo image, extracted from a source stereo image captured by a first stereo camera, from scale associated with the first stereo camera to scale associated with a second stereo camera, to form a transformed foreground stereo image.

(A2) The method denoted as (A1) may further include embedding the transformed foreground stereo image into a target stereo image, captured by the second stereo camera, to form an embedded stereo image.

(A3) The method denoted as (A2) may further include segmenting the target stereo image into (a) a very-near foreground stereo image showing objects of the target stereo image less distant than objects of the transformed foreground stereo image and (b) a background stereo image showing objects of the target stereo image more distant than objects of the transformed foreground stereo image.

(A4) In the method denoted as (A3), the step of embedding may include embedding the transformed foreground stereo image into the target stereo image at a depth between the very-near foreground stereo image and the background stereo image.

(A5) In the methods denoted as (A3) and (A4), the step of embedding may include (a) pasting the transformed foreground stereo image onto the background stereo image to form an intermediate stereo image, and (b) pasting the very-near foreground stereo image onto the intermediate stereo image to form the embedded stereo image.

(A6) In the methods denoted as (A3) through (A5), the step of segmenting may include determining minimum stereo disparity and maximum stereo disparity of the foreground stereo image.

(A7) In the method denoted as (A6), the step of segmenting may include transforming the minimum stereo disparity and maximum stereo disparity from scale associated with the first stereo camera to scale associated with the second stereo camera to obtain transformed minimum stereo disparity and transformed maximum stereo disparity, respectively.

(A8) In the method denoted as (A7), the step of segmenting may include extracting from the target stereo image (a) the very-near foreground stereo image showing objects of the target stereo image having stereo disparity greater than the transformed maximum stereo disparity and (b) the background stereo image showing objects of the target stereo image having stereo disparity less than the transformed minimum stereo disparity.

(A9) In the methods denoted as (A6) through (A8), the step of determining may include determining the minimum stereo disparity and the maximum stereo disparity as extreme values of range of stereo disparities of at least some of boundary pixels of the foreground stereo image.

(A10) In the methods denoted as (A6) through (A9), the step of determining may include determining the minimum stereo disparity and the maximum stereo disparity as extreme values of range of stereo disparities of pixels of a portion of boundary of the foreground stereo image, the portion of the boundary excluding near-horizontal boundary sections.

(A11) In the methods denoted as (A1) through (A10), the step of transforming may include applying a coordinate-correspondence between source pixel coordinates of the source stereo image and target pixel coordinates of the target stereo image to populate pixels, of the transformed foreground stereo image and having target pixel coordinates corresponding to source pixel coordinates of the foreground stereo image, with corresponding pixels of the foreground stereo image, wherein the foreground stereo image is represented in source pixel coordinates and the transformed stereo image is represented in target pixel coordinates.

(A12) In the method denoted as (A11), the coordinate-correspondence may be a function of focal length, baseline length, and principal point location, of the first stereo camera, and focal length, baseline length, and principal point location of the second stereo camera.

(A13) In the methods denoted as (A2) through (A10), the step of embedding may include, if the foreground stereo image extends to a boundary of the source stereo image and the transformed foreground stereo image does not extend to a corresponding boundary of the target stereo image, cropping the embedded stereo image to exclude areas of the embedded stereo image associated with portions of the target stereo image outside the corresponding boundary.

(A14) The methods denoted as (A11) and (A12) may further include embedding the transformed foreground stereo image into a target stereo image, captured by the second stereo camera, to form an embedded stereo image.

(A15) In the method denoted as (A14), the step of embedding may include, if the foreground stereo image extends to a boundary of the source stereo image and the transformed foreground stereo image does not extend to a corresponding boundary of the target stereo image, cropping the embedded stereo image to exclude areas of the embedded stereo image associated with portions of the target stereo image outside the corresponding boundary.

(A16) In the methods denoted as (A1) through (A15), the first stereo camera and the second stereo camera may be rectified to frontal parallel setting.

(A17) The methods denoted as (A1) through (A16) may further include rectifying the first stereo camera and rectifying the second stereo camera.

(A18) The methods denoted as (A1) through (A17) may further include generating the foreground stereo image by extracting the foreground stereo image from the source stereo image.

(A19) In the method denoted as (A18), the step of extracting may include performing an initial segmentation of the source stereo image, using stereo cues, contrast cues, and a stereo disparity search range, to determine an initial foreground stereo image.

(A20) In the method denoted as (A19), the step of extracting may include reducing occlusion-related errors in the initial foreground stereo image to determine the foreground stereo image.

(A21) In the method denoted as (A20), the step of reducing may include invoking one or both of assumptions (a) left boundary of right view of initial foreground stereo image is correct and (b) right boundary of left view of initial foreground stereo image is correct.

(A22) In the method denoted as (A21), the step of reducing may further include utilizing one or both of the assumptions to determine a color distribution model.

(A23) In the method denoted as (A22), the step of reducing may further include refining the initial segmentation in portions of the initial foreground stereo image compromised by occlusion, using the color distribution model, color cues, and contrast cues, to determine the foreground stereo image.

(B1) A system for embedding stereo imagery may include a processor and a memory communicatively coupled with the processor and including instructions that, upon execution by the processor, (a) transform a foreground stereo image, extracted from a source stereo image captured by a first stereo camera, from scale associated with the first stereo camera to scale associated with a second stereo camera, to form a transformed foreground stereo image, and (b) embed the transformed foreground stereo image into a target stereo image captured by the second stereo camera.

(B2) The system denoted as (B1) may further include the first stereo camera and the second stereo camera.

(B3) In the system denoted as (B2), the first and second stereo cameras may be rectified to frontal parallel setting.

(B4) In the systems denoted as (B2) and (B3), the second stereo camera may differ from the first stereo camera in at least one of focal length, baseline, and principal point location.

(B5) In the systems denoted as (B1) through (B4), the memory may include instructions that, upon execution by the processor, perform one or more steps of one or more of the methods denoted as (A3) through (A23).

(C1) A software product may include instructions that are stored on non-transitory computer-readable media and, when executed by a computer, perform steps for embedding stereo imagery, wherein the instructions include instructions for transforming a foreground stereo image, extracted from a source stereo image captured by a first stereo camera, from scale associated with the first stereo camera to scale associated with a second stereo camera, to form a transformed foreground stereo image.

(C2) In the software product denoted as (C1), the instructions may further include instructions for embedding the transformed foreground stereo image into a target stereo image captured by the second stereo camera.

(C3) The software product denoted as (C2) may further include instructions for segmenting the target stereo image into (a) a very-near foreground stereo image showing objects of the target stereo image less distant than objects of the transformed foreground stereo image and (b) a background stereo image showing objects of the target stereo image more distant than objects of the transformed foreground stereo image;

(C4) The software product denoted as (C3) may further include instructions for embedding the transformed foreground stereo image into the target stereo image at depth between the very-near foreground stereo image and the background stereo image.

(C5) In the software product denoted as (C4), the instructions for embedding may include instructions for pasting the transformed foreground stereo image onto the background stereo image to form an intermediate stereo image, and instructions for pasting the very-near foreground stereo image onto the intermediate stereo image to form the embedded stereo image.

(C6) The software products denoted as (C1) through (C5) may further include instructions for extracting the foreground stereo image.

(C7) In the software product denoted as (C6), the instructions for extracting the foreground stereo image may include instructions for performing an initial segmentation of the source stereo image, using stereo cues, contrast cues, and a stereo disparity search range, to determine an initial foreground stereo image.

(C8) In the software product denoted as (C7), the instructions for extracting the foreground stereo image may include instructions for reducing occlusion-related errors in the initial foreground stereo image to determine the foreground stereo image.

(C9) The software products denoted as (C1) through (C8) may further include instructions for extracting the very-near foreground stereo image from the target stereo image by applying the instructions for extracting the foreground stereo image to the target stereo image with minimum value of the stereo disparity search range being greater than maximum stereo disparity of the foreground stereo image.

(C10) In the software products denoted as (C1) through (C9), the instructions for transforming may include instructions for applying a coordinate-correspondence between source pixel coordinates of the source stereo image and target pixel coordinates of the target stereo image to populate pixels, of the transformed foreground stereo image and having target pixel coordinates corresponding to source pixel coordinates of the foreground stereo image, with corresponding pixels of the foreground stereo image, wherein the foreground stereo image is represented in source pixel coordinates and the transformed stereo image is represented in target pixel coordinates.

(C11) In the software product denoted as (C10), the coordinate-correspondence may be a function of focal length, baseline length, and principal point location, of the first stereo camera, and focal length, baseline length, and principal point location of the second stereo camera.

(C12) The software products denoted as (C1) through (C12) may include instructions for performing one or more of the one or more of the methods denoted as (A3) through (A23).

(C13) The software products denoted as (C1) through (C12) may be implemented in and utilized by one or more of the systems denoted as (B1) through (B5), wherein the software product may be stored in the memory of the systems denoted as (B1) through (B5), and the instructions of the software product may be executed by the processor of the systems denoted as (B1) through (B5).

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present system and method, which, as a matter of language, might be said to fall therebetween.

What is claimed is:

1. A method for embedding stereo imagery, comprising:
    transforming a foreground stereo image, extracted from a source stereo image captured by a first stereo camera, from scale associated with the first stereo camera to scale associated with a second stereo camera, to form a transformed foreground stereo image; and
    embedding the transformed foreground stereo image into a target stereo image, captured by the second stereo camera, to form an embedded stereo image.

2. The method of claim 1,
    further comprising segmenting the target stereo image into (a) a very-near foreground stereo image showing objects of the target stereo image less distant than objects of the transformed foreground stereo image and (b) a background stereo image showing objects of the target stereo image more distant than objects of the transformed foreground stereo image;
    the step of embedding comprising embedding the transformed foreground stereo image into the target stereo image at depth between the very-near foreground stereo image and the background stereo image.

3. The method of claim 2, the step of embedding comprising:
    pasting the transformed foreground stereo image onto the background stereo image to form an intermediate stereo image, and
    pasting the very-near foreground stereo image onto the intermediate stereo image to form the embedded stereo image.

4. The method of claim 2, the step of segmenting comprising:
    determining minimum stereo disparity and maximum stereo disparity of the foreground stereo image;
    transforming the minimum stereo disparity and maximum stereo disparity from scale associated with the first stereo camera to scale associated with the second stereo camera to obtain transformed minimum stereo disparity and transformed maximum stereo disparity, respectively; and
    extracting from the target stereo image (a) the very-near foreground stereo image showing objects of the target stereo image having stereo disparity greater than the transformed maximum stereo disparity and (b) the background stereo image showing objects of the target stereo image having stereo disparity less than the transformed minimum stereo disparity.

5. The method of claim 4, the step of determining comprising determining the minimum stereo disparity and the maximum stereo disparity as extreme values of range of stereo disparities of at least some of boundary pixels of the foreground stereo image.

6. The method of claim 4, the step of determining comprising determining the minimum stereo disparity and the maximum stereo disparity as extreme values of range of stereo disparities of pixels of a portion of boundary of the foreground stereo image, the portion of the boundary excluding near-horizontal boundary sections.

7. The method of claim 1, the step of transforming comprising applying a coordinate-correspondence between source pixel coordinates of the source stereo image and target pixel coordinates of the target stereo image to populate pixels, of the transformed foreground stereo image and having target pixel coordinates corresponding to source pixel coordinates of the foreground stereo image, with corresponding pixels of the foreground stereo image, wherein the foreground stereo image is represented in source pixel coordinates and the transformed stereo image is represented in target pixel coordinates.

8. The method of claim 7, the coordinate-correspondence being a function of focal length, baseline length, and principal point location, of the first stereo camera, and focal length, baseline length, and principal point location of the second stereo camera.

9. The method of claim 1, the step of embedding comprising, if the foreground stereo image extends to a boundary of the source stereo image and the transformed foreground stereo image does not extend to a corresponding boundary of the target stereo image, cropping the embedded stereo image to exclude areas of the embedded stereo image associated with portions of the target stereo image outside the corresponding boundary.

10. The method of claim 1, the first stereo camera and the second stereo camera being rectified to frontal parallel setting.

11. The method of claim 10, further comprising rectifying the first stereo camera and rectifying the second stereo camera.

12. The method of claim 1, further comprising generating the foreground stereo image by extracting the foreground stereo image from the source stereo image.

13. The method of claim 12, the step of extracting comprising:
    performing an initial segmentation of the source stereo image, using stereo cues, contrast cues, and a stereo disparity search range, to determine an initial foreground stereo image; and
    reducing occlusion-related errors in the initial foreground stereo image to determine the foreground stereo image.

14. The method of claim 13, the step of reducing comprising invoking one or both of assumptions (a) left boundary of right view of initial foreground stereo image is correct and (b) right boundary of left view of initial foreground stereo image is correct.

15. The method of claim 14, the step of reducing further comprising:
    utilizing one or both of the assumptions to determine a color distribution model; and
    refining the initial segmentation in portions of the initial foreground stereo image compromised by occlusion, using the color distribution model, color cues, and contrast cues, to determine the foreground stereo image.

16. A system for embedding stereo imagery, comprising:
a processor; and
a memory communicatively coupled with the processor and including instructions that, upon execution by the processor, (a) transform a foreground stereo image, extracted from a source stereo image captured by a first stereo camera, from scale associated with the first stereo camera to scale associated with a second stereo camera, to form a transformed foreground stereo image, and (b) embed the transformed foreground stereo image into a target stereo image captured by the second stereo camera.

17. The system of claim 16, further comprising the first stereo camera and the second stereo camera, the first and second stereo cameras being rectified to frontal parallel setting, and the second stereo camera differing from the first stereo camera in at least one of focal length, baseline, and principal point location.

18. A software product comprising instructions, stored on non-transitory computer-readable media, wherein the instructions, when executed by a computer, perform steps for embedding stereo imagery, comprising:
instructions for transforming a foreground stereo image, extracted from a source stereo image captured by a first stereo camera, from scale associated with the first stereo camera to scale associated with a second stereo camera, to form a transformed foreground stereo image; and
instructions for embedding the transformed foreground stereo image into a target stereo image captured by the second stereo camera.

19. The software product of claim 18, the instructions for transforming comprising instructions for applying a coordinate-correspondence between source pixel coordinates of the source stereo image and target pixel coordinates of the target stereo image to populate pixels, of the transformed foreground stereo image and having target pixel coordinates corresponding to source pixel coordinates of the foreground stereo image, with corresponding pixels of the foreground stereo image, wherein the foreground stereo image is represented in source pixel coordinates and the transformed stereo image is represented in target pixel coordinates and wherein the coordinate-correspondence is a function of focal length, baseline length, and principal point location, of the first stereo camera, and focal length, baseline length, and principal point location of the second stereo camera.

20. The software product of claim 18, further comprising:
instructions for segmenting the target stereo image into (a) a very-near foreground stereo image showing objects of the target stereo image less distant than objects of the transformed foreground stereo image and (b) a background stereo image showing objects of the target stereo image more distant than objects of the transformed foreground stereo image;
instructions for embedding the transformed foreground stereo image into the target stereo image at depth between the very-near foreground stereo image and the background stereo image.

21. The software product of claim 20, the instructions for embedding comprising:
instructions for pasting the transformed foreground stereo image onto the background stereo image to form an intermediate stereo image; and
instructions for pasting the very-near foreground stereo image onto the intermediate stereo image to form the embedded stereo image.

22. The software product of claim 20, further comprising instructions for extracting the foreground stereo image, including:
instructions for performing an initial segmentation of the source stereo image, using stereo cues, contrast cues, and a stereo disparity search range, to determine an initial foreground stereo image; and
instructions for reducing occlusion-related errors in the initial foreground stereo image to determine the foreground stereo image.

23. The software product of claim 22, further comprising instructions for extracting the very-near foreground stereo image from the target stereo image by applying the instructions for extracting the foreground stereo image to the target stereo image with minimum value of the stereo disparity search range being greater than maximum stereo disparity of the foreground stereo image.

* * * * *